15,504,488A

United States Patent [19]
Henderson et al.

[11] Patent Number: 5,504,488
[45] Date of Patent: Apr. 2, 1996

[54] TRAFFIC RADAR WITH DIGITAL SIGNAL PROCESSING

[75] Inventors: Richard L. Henderson, Kansas City, Mo.; John M. Kusek, Overland Park, Kans.; Donald R. Bradrick, Independence, Mo.

[73] Assignee: Kustom Signals, Inc., Lenexa, Kans.

[21] Appl. No.: 321,536

[22] Filed: Oct. 11, 1994

Related U.S. Application Data

[63] Continuation-in-part of Ser. No. 268,621, Jun. 30, 1994.

[51] Int. Cl.$^6$ .................................................. G01S 13/58
[52] U.S. Cl. ............................................................ 342/115
[58] Field of Search .................................... 342/104, 115, 342/116, 196, 195, 193, 192, 91, 92, 93, 98

[56] References Cited

U.S. PATENT DOCUMENTS

| | | | |
|---|---|---|---|
| 3,631,486 | 12/1971 | Anders et al. | 342/116 |
| 4,214,243 | 7/1980 | Patterson | 342/115 |
| 4,236,140 | 11/1980 | Aker et al. | 342/115 |

OTHER PUBLICATIONS

Brochure—H. A. W. K. Traffic Safety Radar, Kustom Signals, Inc., Lenexa, Kansas.
Brochure—Muni Quip MDR-1, Tribar Industries, Inc., Downsview, Ontario, Canada.
Brochure—Stalker ATR, Applied Concepts Marketing, Inc., Richardson, Texas.

*Primary Examiner*—Daniel T. Pihulic
*Attorney, Agent, or Firm*—Chase & Yakimo

[57] ABSTRACT

A traffic radar processes Doppler return information by analysis of the received frequency spectrum in order to improve target identification and minimize interference and unwanted harmonics. Digital signal processing including transformation of the return information into the frequency domain is employed to provide multiple modes of operation including a stationary mode where either the strongest or the fastest Doppler return signal may be selectively recognized, and moving modes for monitoring traffic moving in both the opposite direction and the same direction as the patrol vehicle. In the moving modes either strongest or fastest signal processing may be elected, and operation when the patrol and target vehicles are moving in the same direction is provided irrespective of whether the patrol vehicle is moving faster or slower than the target vehicle. The speed of the patrol car is determined by recognizing a signature that exhibits an asymmetry due to the cosine effect. Interference and harmonics are detected and suppressed by recognizing unwanted harmonic patterns and eliminating signal magnitudes at the harmonic frequencies. The radar has multi-band capability and recognizes the frequency band of a selected antenna to automatically configure the radar for correct processing of Doppler return information.

5 Claims, 34 Drawing Sheets

TRAFFIC RADAR WITH DIGITAL SIGNAL PROCESSING

CROSS-REFERENCE

This application is a continuation-in-part of application Ser. No. 08/268,621, filed Jun. 30, 1994.

BACKGROUND OF THE INVENTION

This invention relates to improvements in traffic radar devices for law enforcement and related applications in which the speed of a target vehicle is detected from a stationary or moving transmitter location and, in particular, to a method and apparatus for processing Doppler return information by analysis of the entire frequency spectrum in order to improve target identification and minimize interference and unwanted harmonics, and for recognizing the frequency of a selected radar antenna and automatically configuring the system for correct Doppler processing.

Traditional analog traffic radar employs an array of tuneable lowpass, bandpass and notch filters, phase-locked loops and automatic gain control circuitry to determine patrol vehicle and traffic target vehicle speeds. A microwave frequency transmitter sends a low power single frequency carrier through an antenna towards moving vehicle targets. The microwave signal is reflected off the targets and a portion of the reflected signal is received, mixed and amplified by the receiver section of the antenna. This yields an audio frequency sine wave whose frequency (Doppler frequency) is directly proportional to the speed of a target vehicle.

The Doppler frequency is also governed by the cosine effect. If the vehicle is moving directly toward or away from the antenna, resulting in a reflection angle of zero degrees, the return sine wave frequency is directly proportional to the true speed of the vehicle, i.e., the return frequency is equal to vehicle speed times a frequency constant, multiplied by the cosine of the angle between the antenna and the vehicle. Therefore, if the vehicle's direction is at an angle other than zero degrees, the cosine effect reduces the return frequency by the cosine of the angle between the antenna and the vehicle, with the extreme case of a vehicle traveling at a 90 degree angle resulting in a return frequency of zero Hertz.

In stationary mode, where the patrol vehicle is parked, the analog radar bases all target vehicle speed processing on the strongest return signal. In moving mode, where the patrol vehicle is in motion, the assumption is made that the strongest return signal is that of the patrol car and the next strongest signal is that resulting from a target vehicle. Strong forms of interference or signal return instances that violate these criteria render the displayed speeds invalid, requiring that the officer operating the radar recognize the error and ignore the displayed speeds. In these cases as well as all of the other aspects of the operation of a traffic radar, any opportunity for error by the operating officer is to be avoided in order to maximize the credibility of the evidence obtained.

SUMMARY OF THE INVENTION

It is, therefore, an important object of the present invention to provide a traffic radar in which vehicle speed processing is not based solely upon the strength of the return signals, and which is relatively immune to various forms of interference that are often troublesome in traditional analog traffic radar.

Another important object of the invention is to provide a method and apparatus for determining the speed of the fastest target vehicle even if that vehicle does not provide the strongest return signal, through the use of digital signal processing that allows the frequency spectrum of the Doppler return information to be analyzed and the fastest vehicle thereby located.

Another important object of the invention is to provide a method and apparatus for identifying the return signal produced by a moving patrol vehicle in which the traffic radar is installed, wherein a characteristic signature of the patrol vehicle return is recognized without regard to whether or not such signal is the strongest signal received.

It is also an important object of the invention to provide the methods and apparatus as aforesaid in a traffic radar unit in which various modes of operation may be selected by the operator, including stationary modes in which either the strongest or the fastest signal may be selected, moving modes in which oncoming traffic in the opposite lane may be detected on either a strongest or fastest signal basis, and moving modes in the same lane where processing depends upon whether the patrol vehicle is moving at a slower or faster speed than a target vehicle.

A further and important object of the present invention is to provide a traffic radar in which the processing of Doppler return information is accomplished after transformation of the Doppler signals from the time to the frequency domain in order to provide a frequency spectrum containing the Doppler components which may be examined in accordance with the operational mode selected, and which may be processed to eliminate frequency components caused by interference or unwanted harmonics.

In furtherance of the foregoing object, it is an important aim of this invention to provide a method and apparatus for scanning the frequency spectrum of the Doppler return information to recognize a harmonic pattern indicative of interference and/or searching the spectrum for any harmonics of a patrol vehicle return signal, and then eliminating the magnitude of any harmonic frequency recognized or found.

Still another important object is to provide a Doppler traffic radar having multi-band capability and which stores the operating parameters for each band, and which recognizes the frequency band of a selected radar antenna and applies the operating parameters for that band to automatically configure the radar for correct processing of Doppler return information.

Other objects will become apparent as the detailed description proceeds.

Each of FIGS. 8–16 is a diagram showing a frequency spectrum at a corresponding stage of the signal processing of the present invention in the frequency domain.

FIGS. 17–34 comprise detailed flow charts of the software that processes the Doppler return data.

HARDWARE AND SIGNAL FLOW

Figure 1:
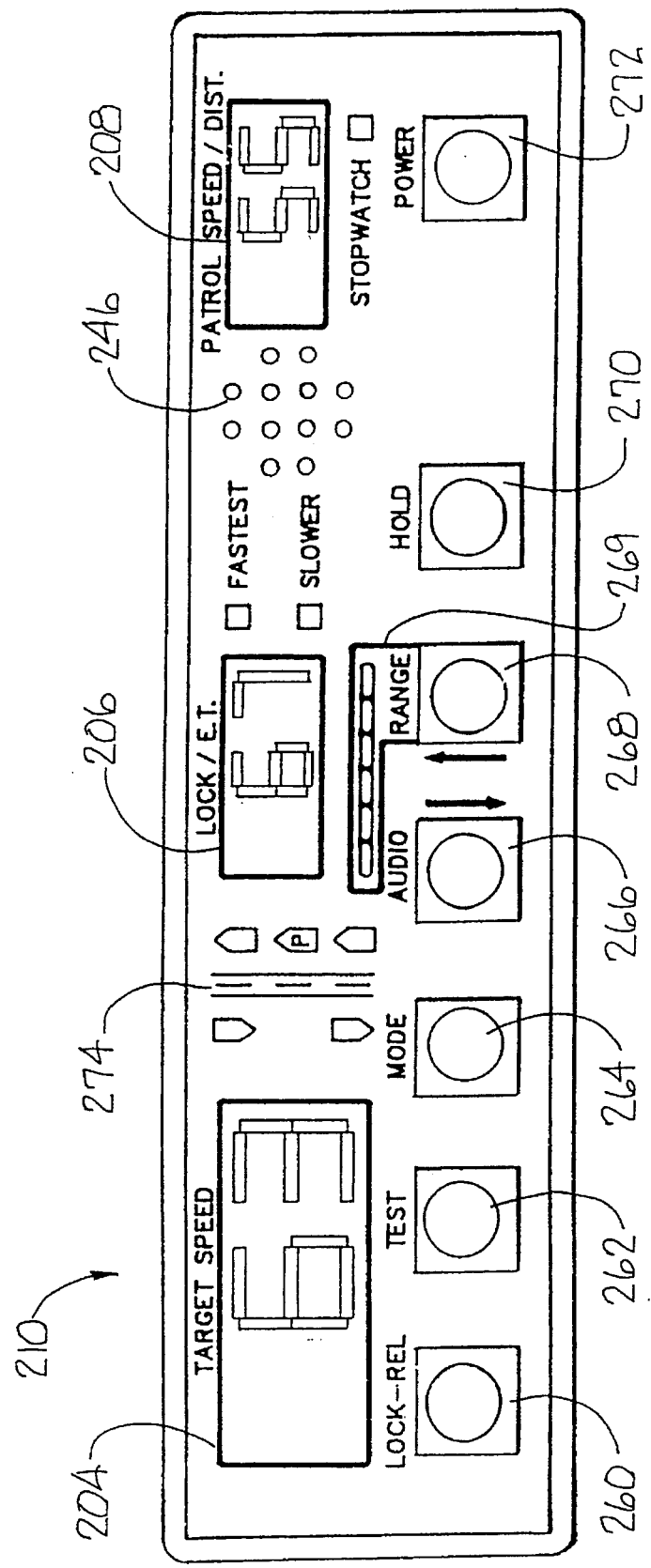
FIG. 1 is a front elevational view of the indicator and control unit of the traffic radar of the present invention, and shows the various control buttons, indicators and digital displays.

The traffic radar device of the present invention has two microprocessor based systems, a logic control system (FIG. 4) utilizing a general purpose 8-bit microcontroller unit (MCU) 200 and a signal processing system (FIG. 3) employing a 16-bit block floating point digital signal processor (DSP) 202. These systems work in tandem to process control options and radar Doppler return signals, screen and search for interference patterns, then determine a combination of target and/or patrol vehicle speeds and indicate those speeds to the operator, typically by means of digital displays such as shown at 204, 206 and 208 on the front display panel 210 of the indicator and control unit of the radar (FIG. 1).

Figure 3:
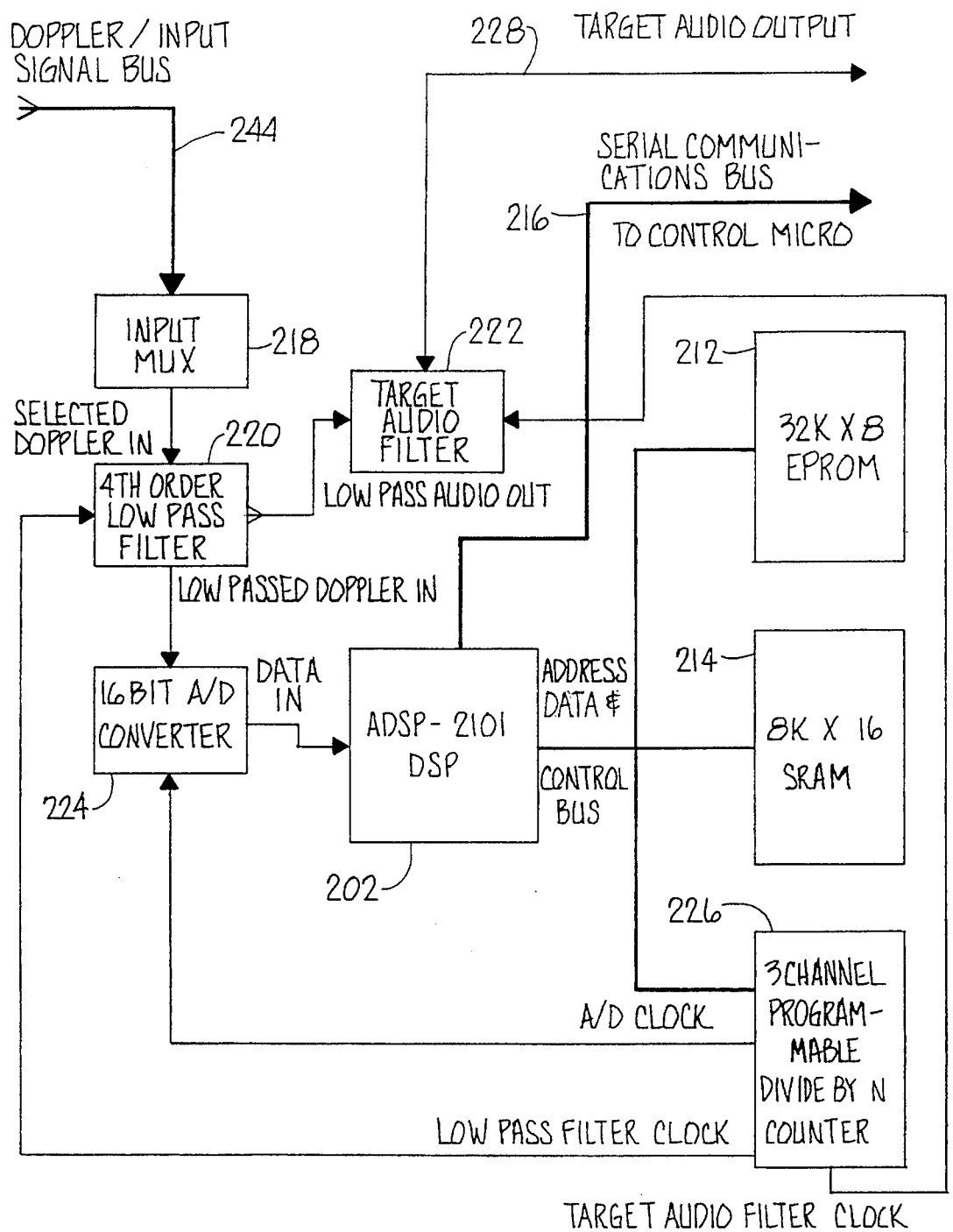
FIG. 3 is a block diagram of the signal processing system of the present invention.

The signal processor is a dedicated, math intensive, microcomputer system shown in the block diagram of FIG. 3. Upon powering the system, the DSP program code and fixed data tables are boot loaded from an EPROM 212. Trigonometric tables and Hamming window coefficients are copied from the EPROM into an external 16-bit data SRAM 214 and the actual 24-bit executable code is loaded into the internal program memory of DSP 202. (A preferred DSP chip is the ADSP-2101 manufactured by Analog Devices of Norwood, mass. U.S.A.) The internal data memory is also used for smaller look-up tables and variable storage. All data and parametric communication between the DSP 202 and MCU 200 is performed using a synchronous serial communications bus 216 and controlled by the DSP 202 in a master/slave mode.

The highest hardware interrupt priority is given to the MCU 200 to force the DSP 202 to immediately initiate data communications in order to receive new command/configuration information. All data/command communication is full duplex with data being sent and received by both processors during each transmission via the serial communications bus 216. All patrol, target and status information is also sent serially from the DSP 202 to the MCU 200, with the DSP mastering the serial bus, the MCU being in serial slave mode. According to the MCU/DSP serial communications protocol, the MCU 200 sends a two byte command packet to the DSP 202 upon initialization of the system and thereafter whenever a change in operation or configuration is desired. The first byte is referred to as the Command byte and the second as the Parameters byte, listed as follows:

| Command List | |
|---|---|
| STANDBY | All DSP activity is halted, DSP is idle |
| GO | Initiate signal processing activity |
| TEST | Initiate self-test sequence |
| MODE | Selects either moving or stationary mode of processing |
| ANTENNA | Selects either front or rear antenna |
| DIRECTION | Selects same or opposite direction of traffic when in moving mode |
| STRONG/FAST | Selects either strongest signal or fastest signal in stationary and/or moving opposite direction mode |
| SLOW | Instructs DSP that target vehicle is traveling slower than patrol vehicle in moving mode, same direction |
| Parameters List | |
| RANGE | Selects moving average range sensitivity factor of one to six with one being least sensitive and six being the most sensitive |
| BAND | Selects either X, K or Ka radar band frequency |
| MPH/KPH | Selects either miles per hour or kilometers per hour speed units |

The DSP 202 sends a 5 byte data packet to the MCU 200 at the completion of each signal processing round:

| BYTE 1 | Command Echo: a repetition of the received command byte |
|---|---|
| BYTE 2 | Parameter Echo: a repetition of the received parameters byte |
| BYTE 3 | Patrol Speed in selected units for LED display, set to zero when in stationary mode or no valid patrol speed detected |
| BYTE 4 | Target Speed in selected units for LED display, set to zero when no valid target speed detected |
| BYTE 5 | Indicates if returned target speed is fastest target (stationary mode or moving mode, opposite direction) or slower than patrol vehicle (moving mode, same direction). Also indicates pass/fail status of self-test sequence. |

Upon receiving control/configuration commands from the MCU 200, the DSP 202 configures the operating hardware by selecting the appropriate input multiplexer (MUX) channel as illustrated at 218 and programming the clock input frequencies of a programmable fourth order low pass filter 220, a target audio filter 222, and an analog-to-digital converter (A/D) 224 by configuring and programming the three dedicated channels of a divide by N counter 226. This matches the clock frequency to the transmission band (X, K or Ka) for correct Doppler processing.

Figure 4:
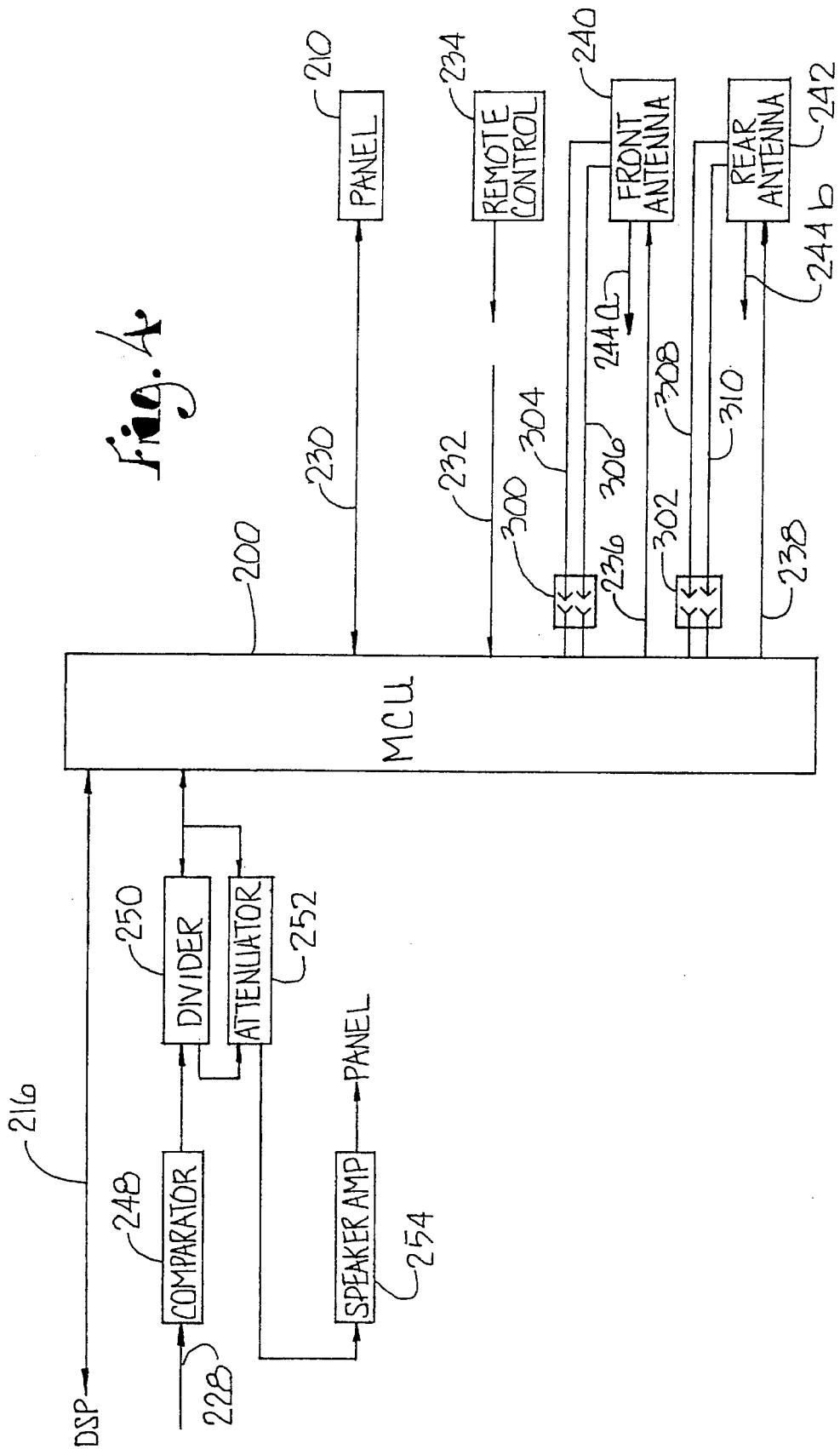
FIG. 4 is a simplified block diagram of the logic control system which communicates with the signal processing system of FIG. 3.

As may be seen in FIG. 4, the serial communications bus 216 extends to the MCU 200 along with other connections including a target audio output line 228 from the audio filter 222 (FIG. 3), a data line 230 interconnecting the MCU 200 and the controls and displays on the panel 210, a communications link 232 from a remote control 234 (FIG. 2) to be discussed, and lines 236 and 238 to front and rear antennas 240 and 242, respectively, on the patrol vehicle to select forward or rearward propagation of the transmitted carrier. Doppler output lines 244a and 244b from the front and rear antennas form a Doppler/input signal bus 244 shown in FIG. 3 extending to the MUX 218.

Each of the antennas 240 and 242 is a plug-in unit that preferably utilizes a connected 300 or 302 having two pins that serve to identify the frequency band of the antenna (X, K or Ka). This is illustrated in FIG. 4 for front antenna 240 by leads 304 and 306 and for rear antenna 242 by leads 308 and 310. Binary logic levels on the lead pair 304–306 and 308–310 identify the band, e.g., for front antenna 240:

X band—lead 304 grounded

K band—lead 306 grounded

Ka band—both leads 304 and 306 grounded

If the MCU 200 reads both pairs high at connector 300 or 302, no antenna is connected.

As is conventional in traffic radar, the logic control system provides target audio to a speaker in the indicator unit seen in FIG. 1, as indicated at 246. Audio output circuitry in FIG. 4 includes a comparator 248 which squares the incoming audio signal to logic levels, a divider 250 which divides the square wave to provide an appropriate audible frequency, and an attenuator and buffer 252 that drives a speaker amplifier 254.

Initial processing and Mode Selection

Figure 5:
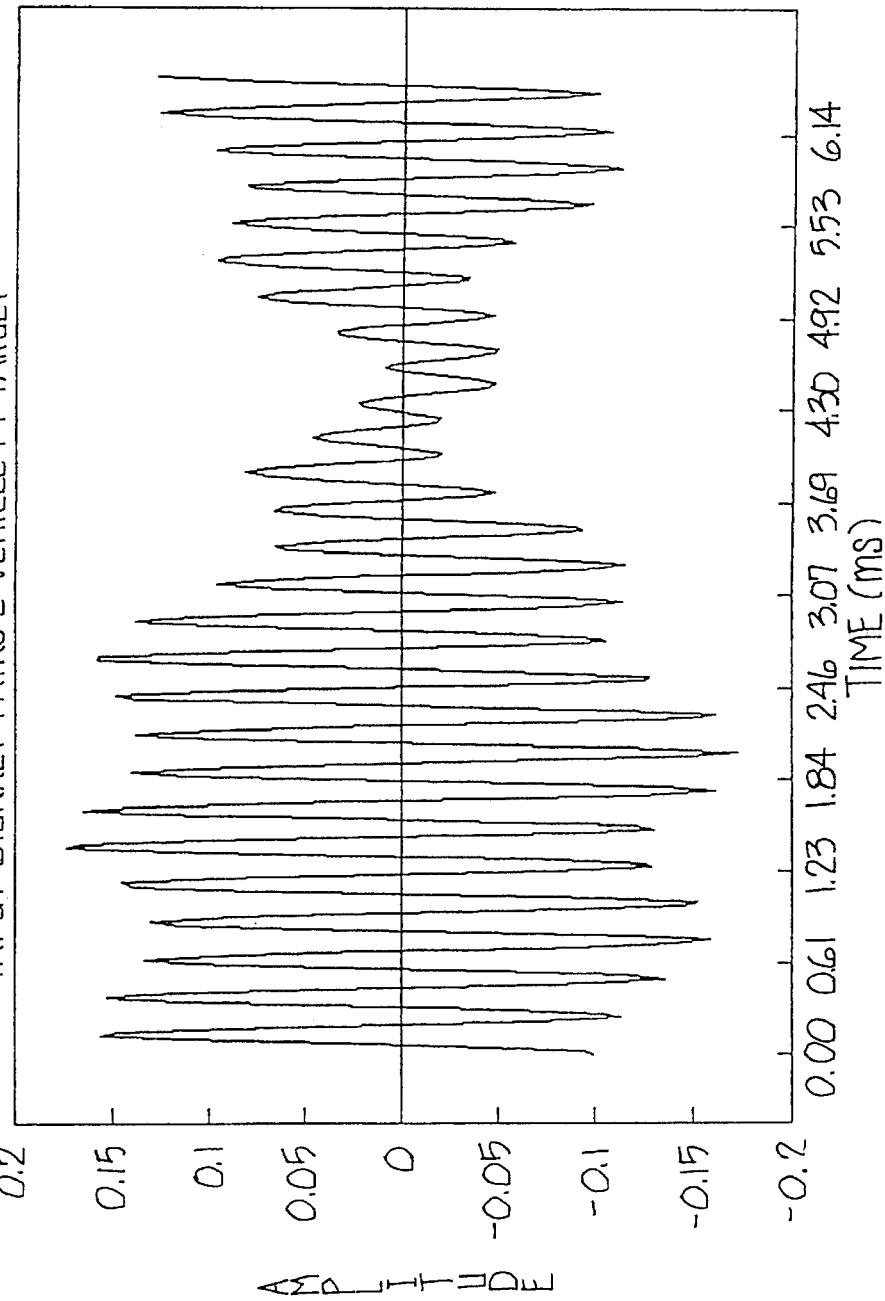
FIGS. 5–7 show waveforms that illustrate the processing of Doppler return information prior to transformation into the frequency domain.
Figure 6:
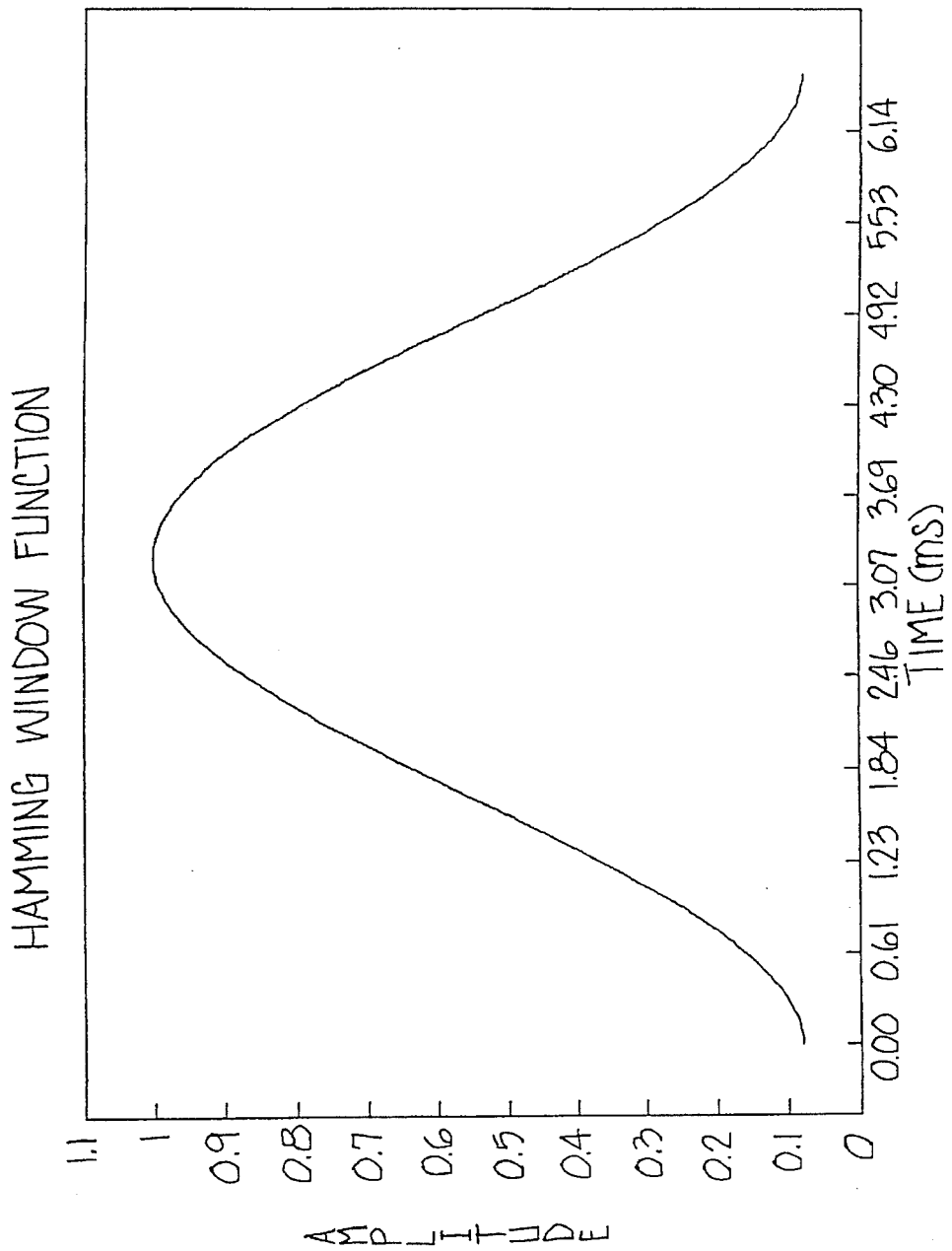
Figure 7:
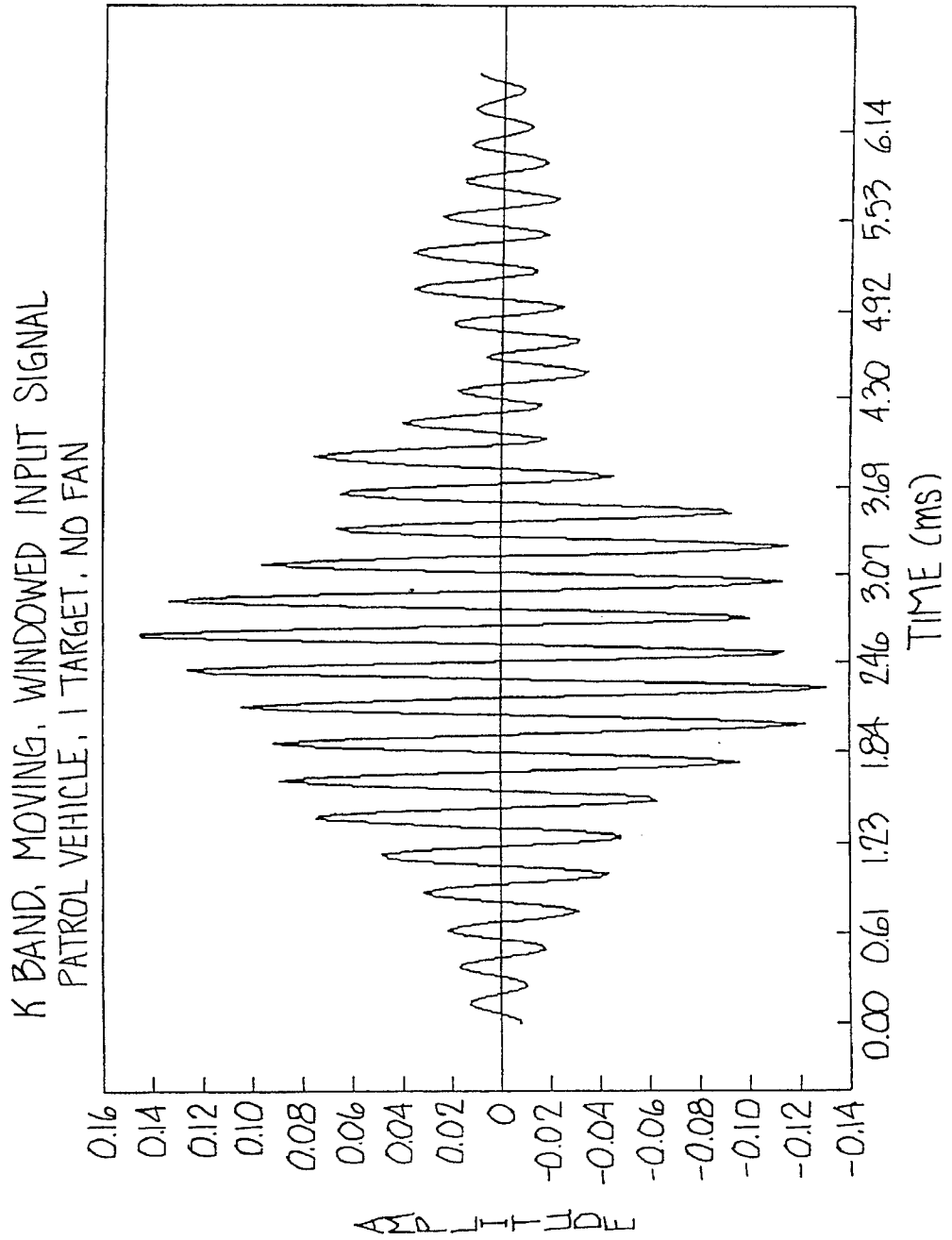
Figure 8:
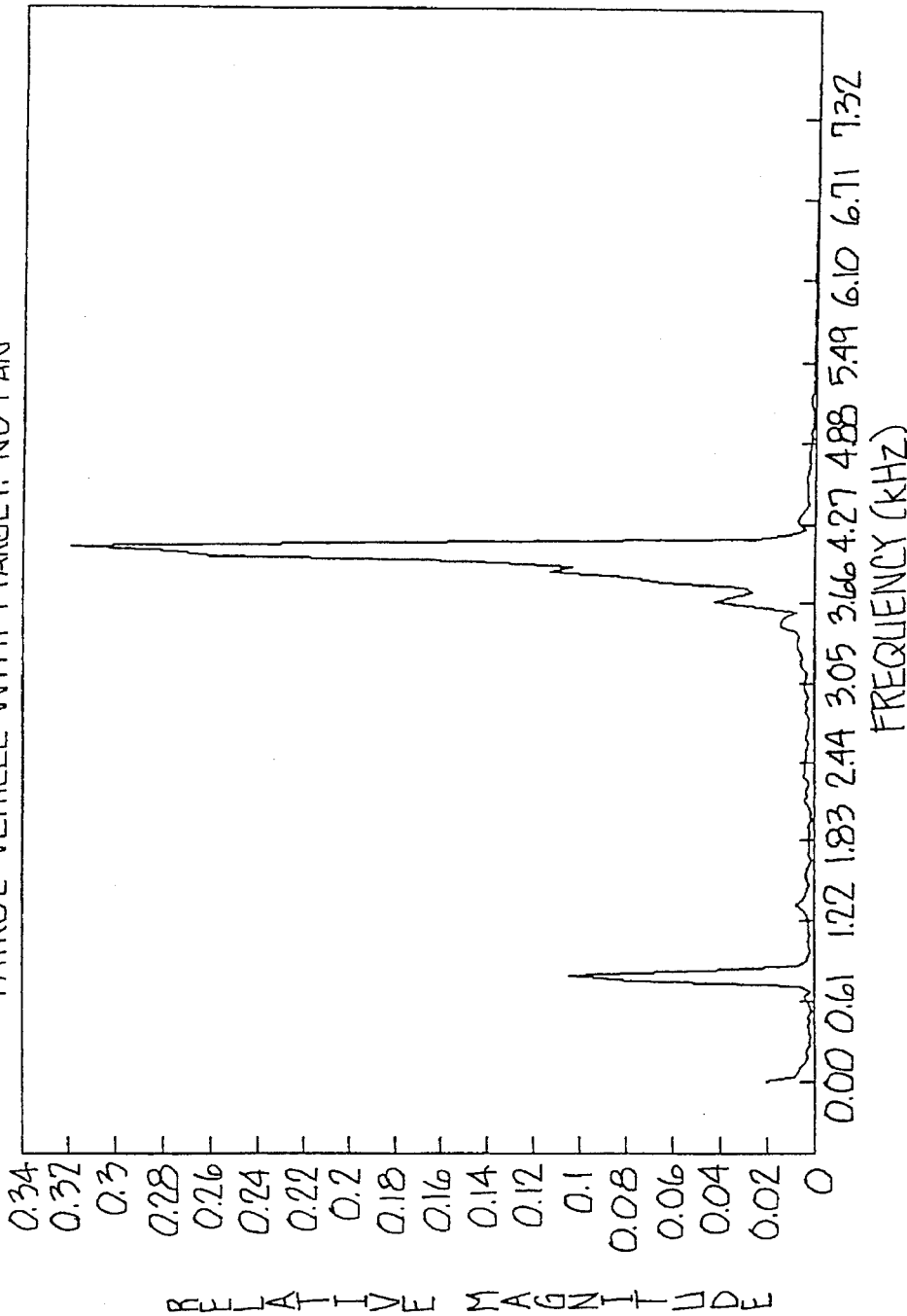

The DSP 202 performs the task of processing the Doppler return information by digitally sampling the Doppler radar return signal in 1024 word blocks. Initial processing is accomplished pursuant to the program illustrated by the decision and processing blocks 1–32 of the flow charts, FIGS. 17–19. Depending on transmitter frequency (radar band), speed ranges and moving/stationary mode of operation desired, the DSP 202 loads the appropriate operating parameters for proper operation. The waveform shown in FIG. 5 illustrates a representative analog output (K band, moving mode, same direction) from the low pass filter 220 prior to conversion into digital data by the A/D 224. Once configured, the DSP 202 waits until a 1024 sample block of data has been loaded from the A/D 224 into external data memory 214. Then to reduce sampling discontinuities, the input data block is multiplied by a Hamming window function (illustrated in FIG. 6) to produce the windowed signal shown in FIG. 7. Transformation of the windowed signal into the frequency domain is then accomplished by a decimation in time, radix-4, block-floating point fast Fourier transform to produce the spectral diagram of FIG. 8. Four complete spectra are averaged together to reduce the effects of transient signals.

Figure 9:
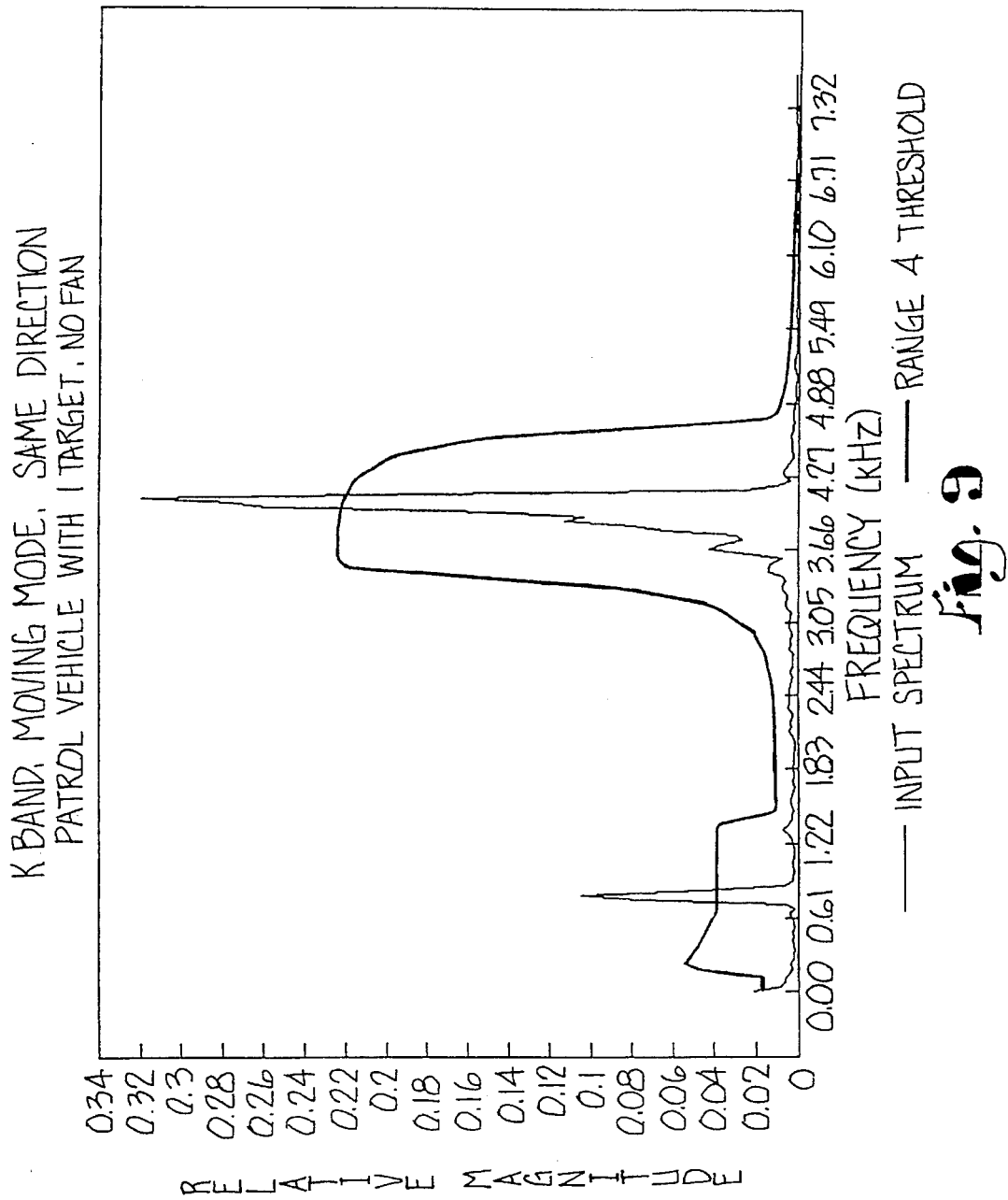
Figure 10:
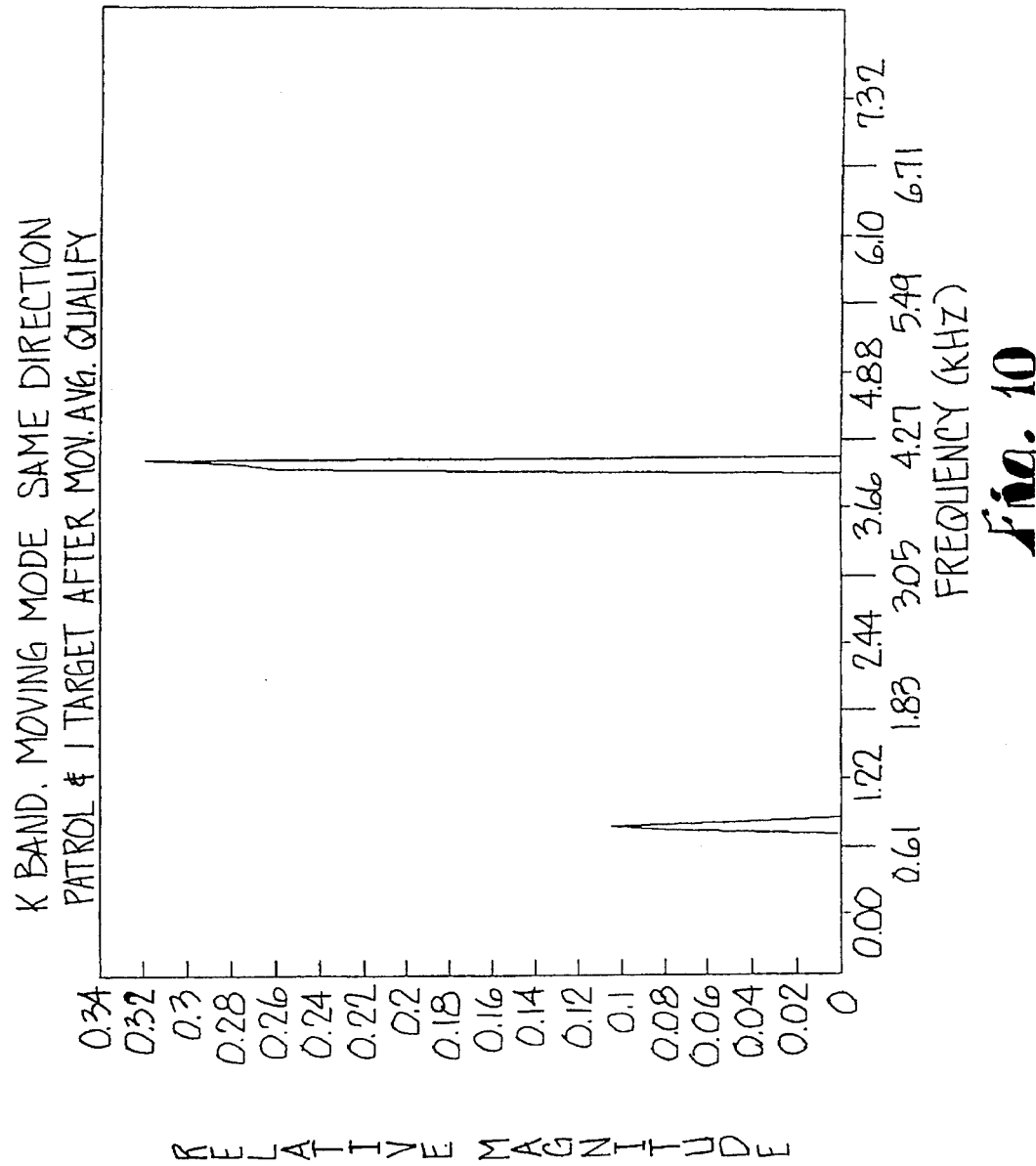

The sensitivity of the input spectrum is then gauged by computing a weighted, moving average of the input spectrum as illustrated in FIG. 9 by the range 4 threshold. A range control setting is read from the MCU 202 (range 4 in FIG. 9) and then translated by the DSP into a weighing factor. The weighing factor is used to scale the moving average (window size of 33 frequency bins) calculation of the input spectrum. A frequency peak must be of a greater magnitude than the weighted, moving average at that frequency in order to be considered valid by the DSP 202. The qualified input spectrum thus obtained (FIG. 10) is then processed for frequency magnitude peaks using a second order slope/derivative method to determine frequency bin maxima. The magnitude and frequency bin index (bin number) of all discovered frequency maxima are saved in a two dimensional array for secondary processing by the DSP, based on the control configuration (stationary or moving) received from the MCU 200.

Up to this point, the signal processing is essentially the same for all modes of operation, input conditioning, spectral power calculation, range setting qualification and frequency peak/magnitude discovery. Secondary processing, however, is varied depending on the input control configuration. The DSP 202 accepts command packets as set forth above all selected by the user and serially transmitted to the DSP 202 by the MCU 200. The modes of operation which may be selected are as follows:

1. Stationary mode, strongest signal
2. Stationary mode, fastest signal
3. Moving mode, opposite direction, strongest signal
4. Moving mode, opposite direction, fastest signal
5. Moving mode, same direction, normal processing
6. Moving mode, same direction, slower target processing Once all frequency peaks and magnitudes have been processed by the DsP 202, the secondary processing is determined by these modes as discussed below under separate headings.

The front panel 210 of the indicator and control unit shown in FIG. 1 presents an example of the type of controls that may be employed to initiate the desired command packets. The digital LED displays illustrated are typical of conventional traffic radar units. The digital display 204 shows the speed of the target vehicle, display 206 shows the locked target vehicle speed, and display 208 shows the speed of the patrol vehicle when one of the moving modes of operation is selected. Control push buttons along the bottom of the panel 210 are, from left to right, a lock-release button 260 which, when depressed, freezes the target speed in display 206. Button 262 initiates an internal test of the equipment. A mode button 264 selects the mode of operation, either stationary or moving. (A stopwatch mode may also be selected, in which case elapsed time is shown on display 206 and entered distance is shown on display 208.) An audio button 266 sets the volume for the Doppler audio delivered at 246 by the speaker. A range control button 268 sets the distance for target capture, a selected one of six range settings being shown by a bar graph 269. A hold switch 270 controls the transmission of the carrier, defeating radar detectors. An on/off power switch is shown at 272. Antenna indicators 274 display the mode of operation and the selected antenna, front or rear.

Figure 2:
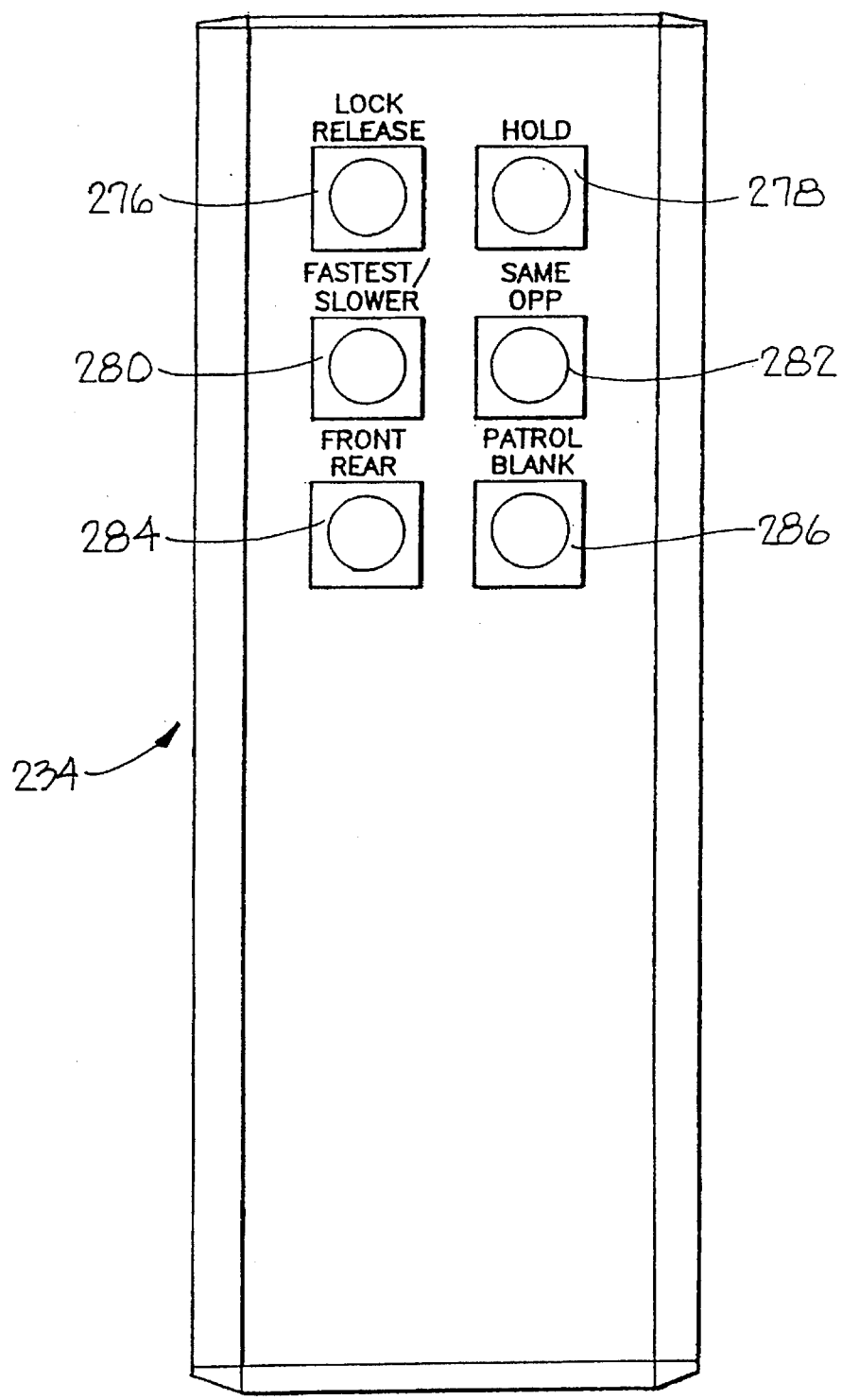
FIG. 2 is a plan view of a remote control for the unit which provides easy access by the operator to six control functions.

The remote control 234 illustrated in FIG. 2 preferably employs an infrared transmitter to avoid the inconvenience of wire connections. A lock-release button 276 and a hold button 278 duplicate the functions of buttons 260 and 270 on the indicator and control unit. Additional functions are provided by the fastest/slower button 280, a same/opposite button 282 and a front/rear button 284. Control button 280 captures the fastest target moving within traffic (stationary and moving/opposite direction mode), or a target moving slower than the patrol vehicle and in the same direction. A "fastest" indicator lamp or a "slower" indicator lamp on panel 210 illuminates to show the corresponding selected mode. Control button 282 selects the direction of target traffic when in a moving mode, i.e., same lane or opposite lane. Control button 284 selects either the front or rear antenna for monitoring traffic to the front or rear of the patrol vehicle. A patrol blank button 286 enables the operator to blank the patrol speed display 208.

Automatic Band Configuration

When control button 284 on the remote control 234 is depressed to select either the front antenna 240 or the rear antenna 242 (FIG. 4), the MCU 200 reads the logic levels on the identification pins of the connector 300 or 302 depending on whether the front or rear antenna is selected. Assuming for purposes of illustration that the front antenna 240 is selected and that it is an x band antenna, the frequency is identified by the different logic levels on leads 304 and 306, lead 304 being grounded or low and lead 306 being ungrounded or high. (It may be appreciated that the ungrounded lead may be pulled high by any conventional means, such as a resistor in the MCU 200 connected from the identification pin to ground.) In response to the identified frequency band, X band in the instant example, MCU 200 commands the DSP 202 to configure the radar for correct processing of Doppler return information via the parameters byte of the command packet, which would indicate that the X band has been selected.

Figure 17:
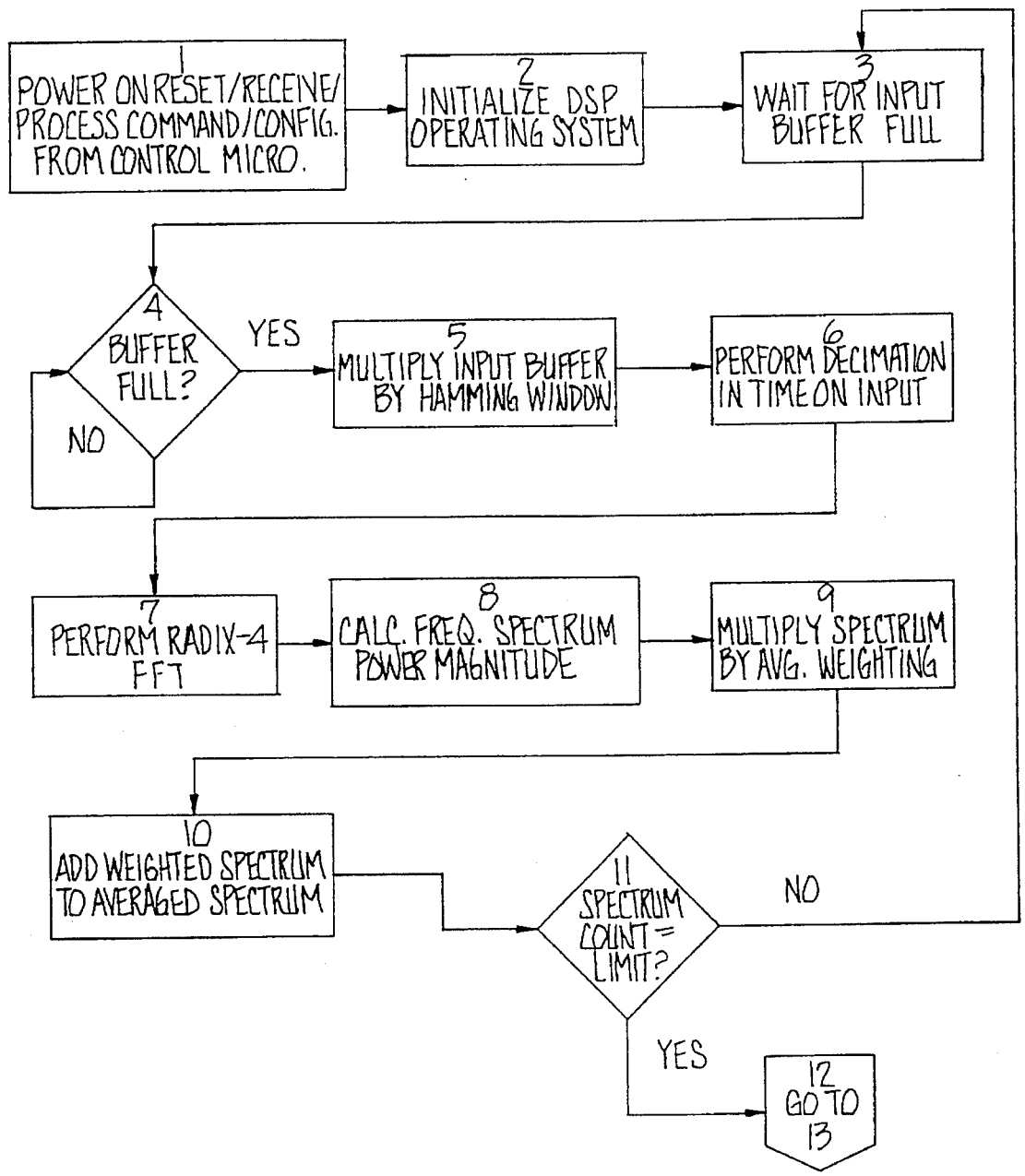
Figure 18:
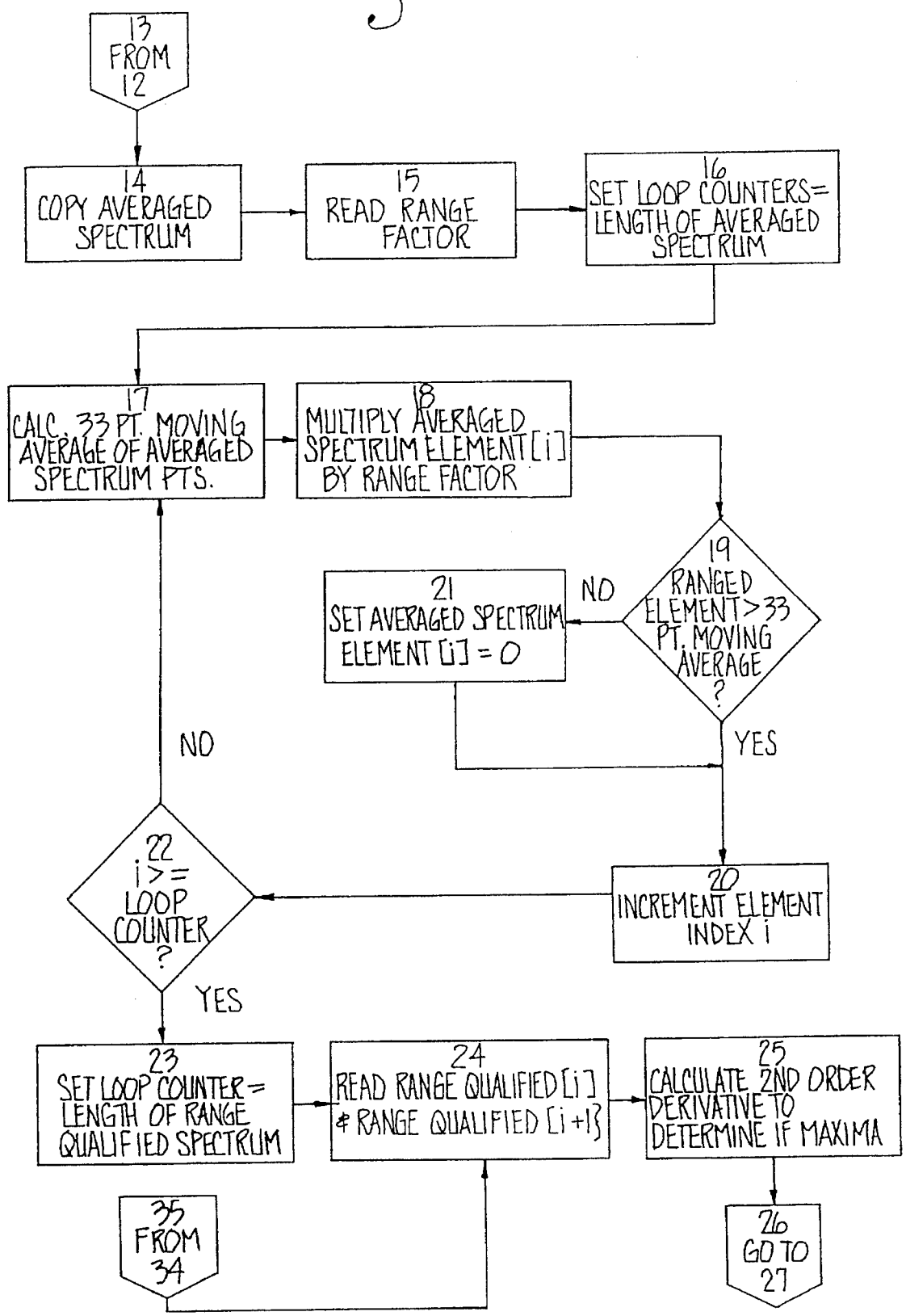
Figure 34:
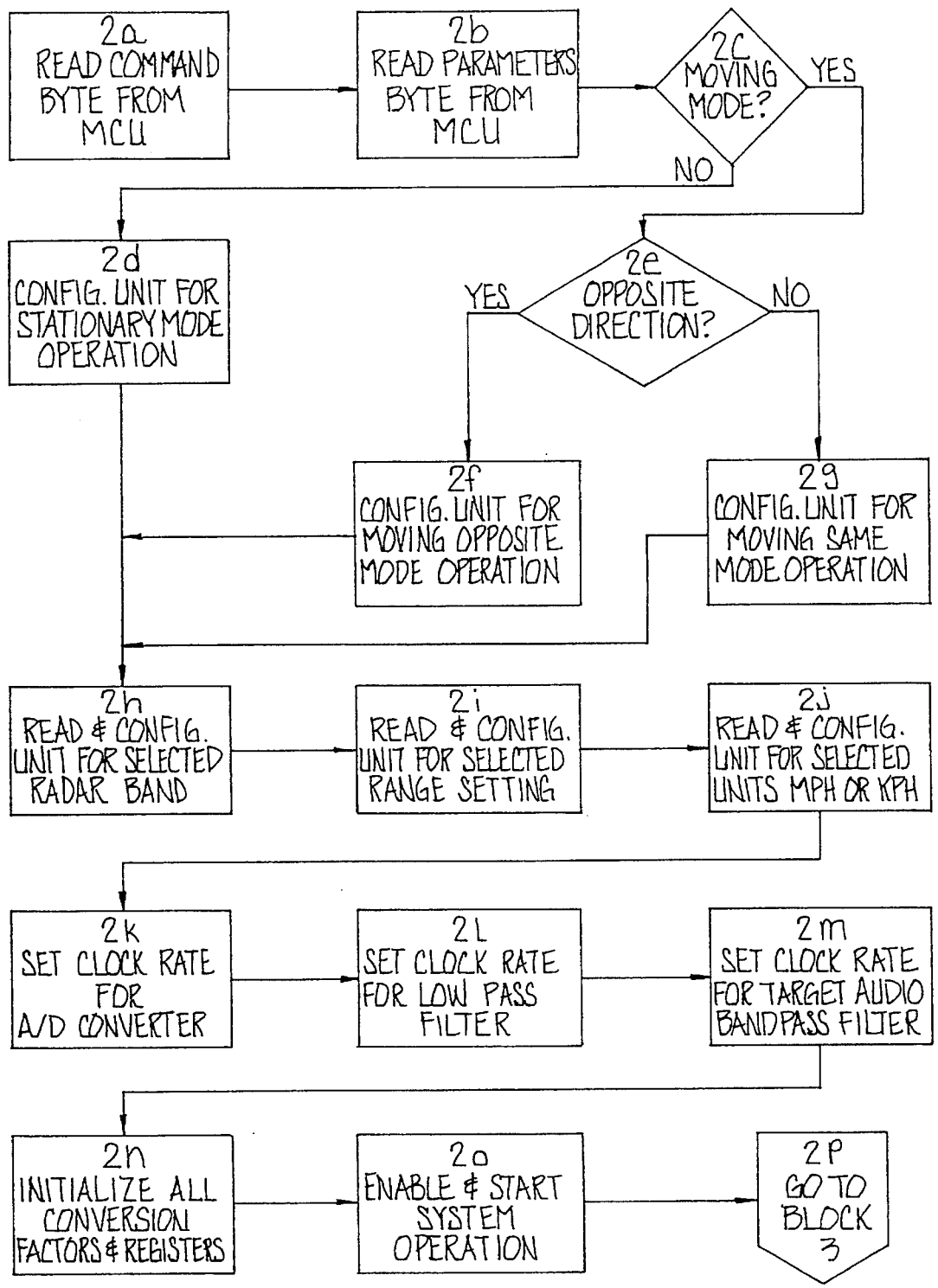

Upon receiving the parameters byte indicating the selected band, the DSP 202 performs operations that are illustrated in detail in the flow chart of FIG. 34. Referring to FIG. 17, it may be seen that processing block 2 is the initialization of the DSP operating system; FIG. 34 is an expansion of block 2 comprising decision and processing sub-blocks 2*a* through 2*p*. As is apparent from the expanded flow chart, the command and parameters bytes are read and initial determinations are made in sub-blocks 2c through 2g to configure the radar unit for the selected mode of operation. Then, sub-blocks 2h through 2n configure the unit in accordance with the selected radar band, range setting and units of measurement, set the clock rates for the A/D converter 224, the low pass filter 220 and the target audio filter 222, and initialize all conversion factors and registers.

In configuring the radar unit for the selected band, the DSP 202 performs a lookup table operation that reads all of the correct operating parameters for the selected band and loads them into operating memory, either internal to the DSP 202 or in the external memory 214. It should be understood, as discussed above, that the fixed data tables and trigonometric tables for all three bands are in permanent storage in the EPROM 212. The basic processing operation is mathematically the same for all bands, only the conversion factors, the A/D conversion rate and the programmable filter frequencies change for each band to accommodate the Doppler return frequencies (which, of course, will differ from band to band for the same target speed). Once the correct operating parameters are loaded, the DSP 202 resumes normal processing operation (sub-blocks 2o and 2p) using the conversion factors for the selected band. The DSP 202 also echos the selected frequency band back to the MCU 200 each time that patrol and target speed information is transmitted.

It should be appreciated that automatic configuration of the radar discussed above assures that Doppler return information will be correctly processed because the system will always be configured in accordance with the selected antenna unit. The possibility of operator error is thus eliminated, and the system can also accommodate front and rear antennas 240 and 242 of different frequencies for dual band operation.

Stationary Mode, Strongest Signal

Figure 19:
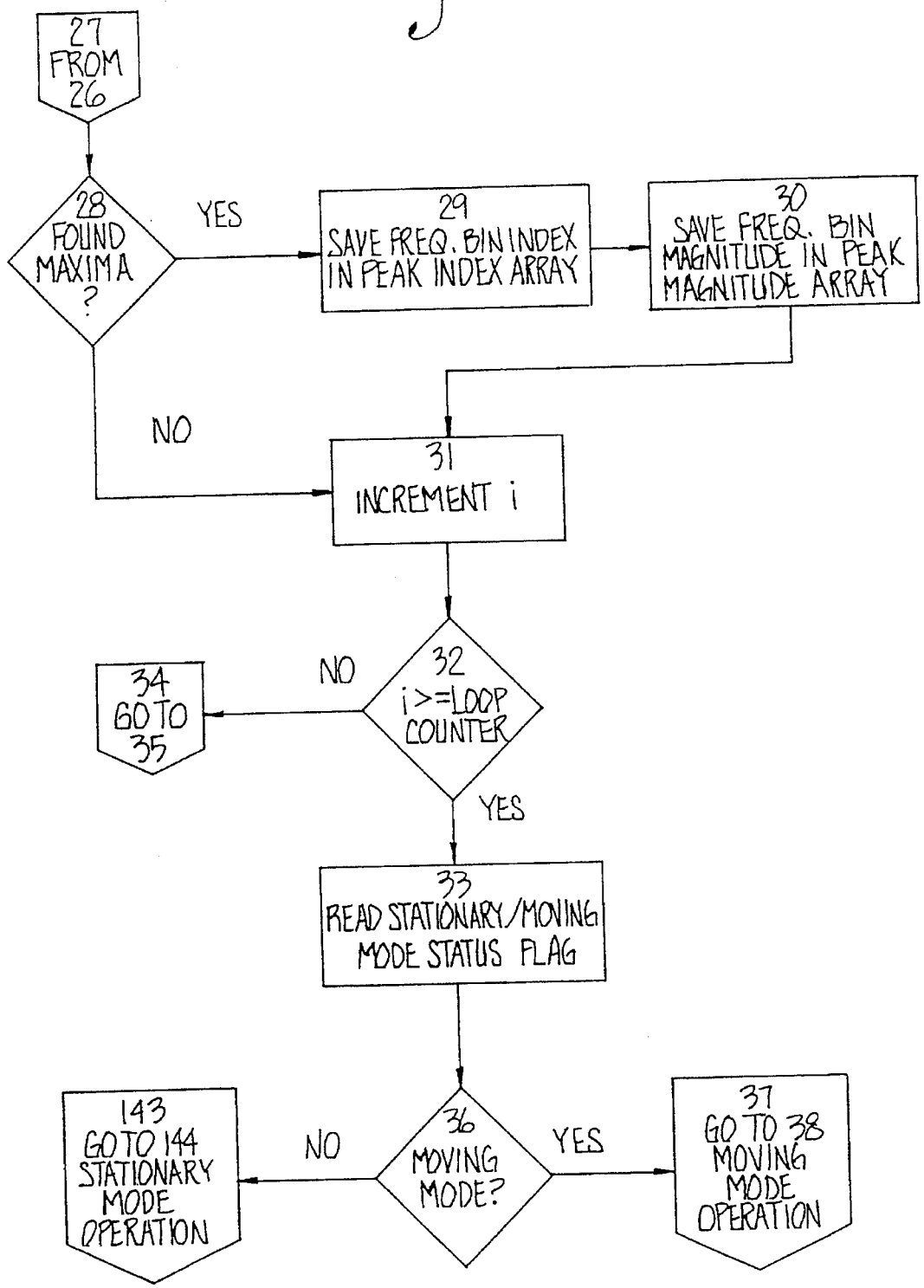

In addition to the spectral diagrams, the following descriptions of this mode and the other modes will refer to the flow charts (FIGS. 17–33) of the programs that process the Doppler return data. Each decision block and processing block is identified in the flow charts by a numerical designation from 1 through 187. Stationary or moving mode selection is read at block 33 (FIG. 19).

Figure 11:
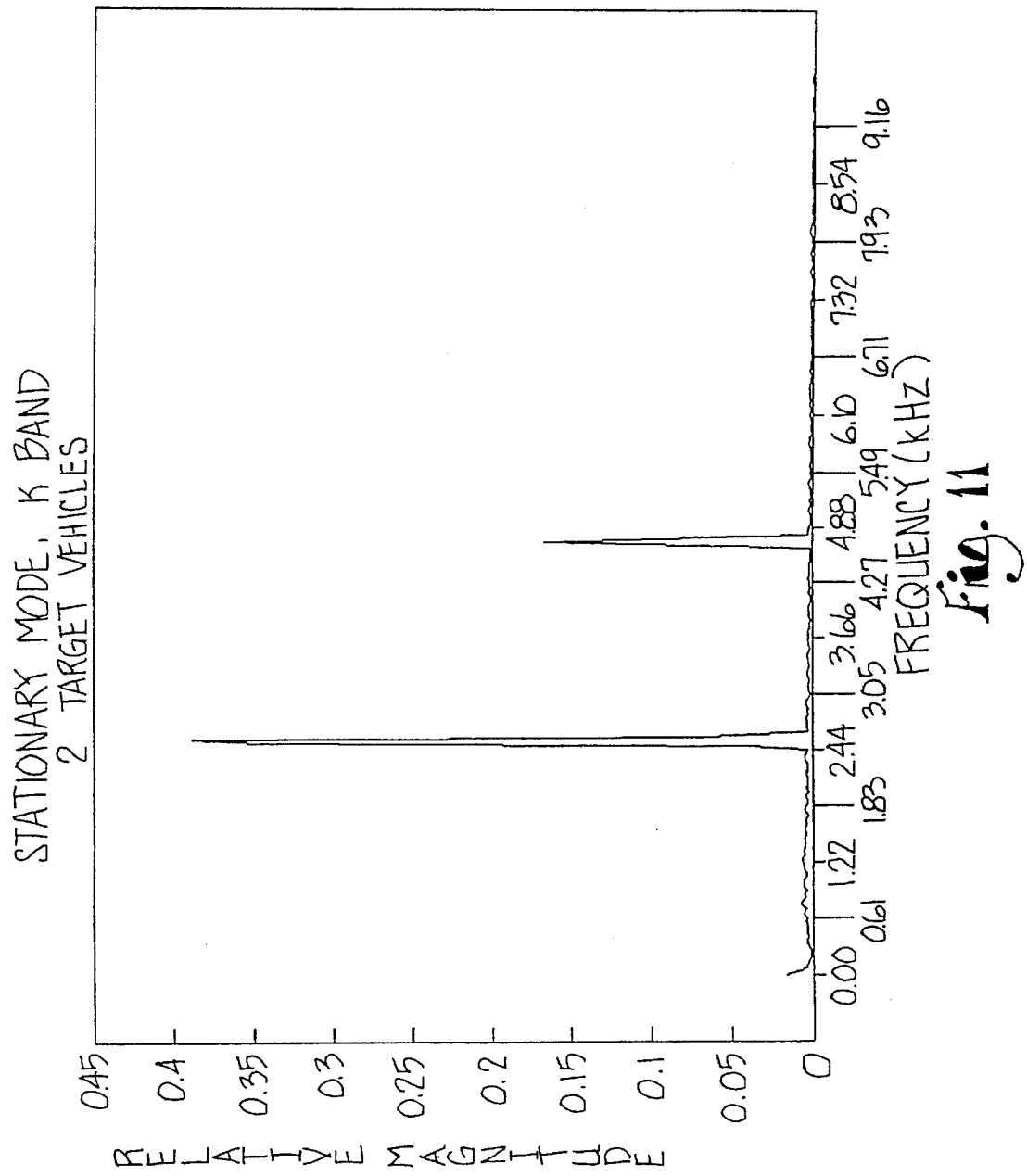

When selected, the stationary, strongest signal mode configures the DSP 202 to accept all return frequencies as absolute Doppler returns, meaning that the target vehicle's speed is directly proportional to the received frequency. The DSP 202 sorts the received frequencies by descending magnitude (block 150, FIG. 30), searches for the strongest signal (blocks 164–175, FIGS. 32 and 29), translates the frequency to desired units of speed measurement (blocks 178 and 181) and then transmits the speed information to the MCU 200 (blocks 184–187, FIG. 33). In FIG. 11, two target vehicle Doppler returns are shown, with the highest magnitude being that of the slower vehicle (lowest frequency approximately 2.44 kHz) and the lowest magnitude being that of the fastest vehicle (approximately 4.75 kHz).

Stationary Mode, Fastest Signal

When selected, this mode is identical to the previous mode with the exception that the Doppler return signals are sorted (block 151, FIG. 30) according to descending frequency. The DSP searches for the fastest signal as shown in blocks 156–163, FIG. 31. The highest frequency signal is then translated to speed and transmitted to the MCU 200 (blocks 181 and 184–187). In traditional analog radars, the highest frequency signal in FIG. 11 could not be seen by the radar. By the DSP 202 scanning the frequency spectrum and qualifying all signals, a faster, yet lower magnitude (corresponding to either a large cross-sectional area target farther away or a small cross-sectional area target in closer) target vehicle's speed may be tracked.

Moving Mode, General Operation

When the DSP 202 is placed into the moving mode of operation (blocks 87–90, FIG. 25), the patrol vehicle speed must be determined prior to target speed determination because the antenna is also is motion, thus altering the Doppler frequency shifts of any target vehicle return signals. Once the patrol vehicle speed has been determined, the target vehicle speed may then be determined based on the complete mode definition.

The DSP based radar reduces the likelihood of erroneous patrol and target vehicle speed display through the use of spectrum analysis, periodic noise and patrol vehicle pattern recognition techniques and by monitoring a historical record of displayed speeds.

Moving Mode, Opposite Direction, Strongest Signal

Figure 12:
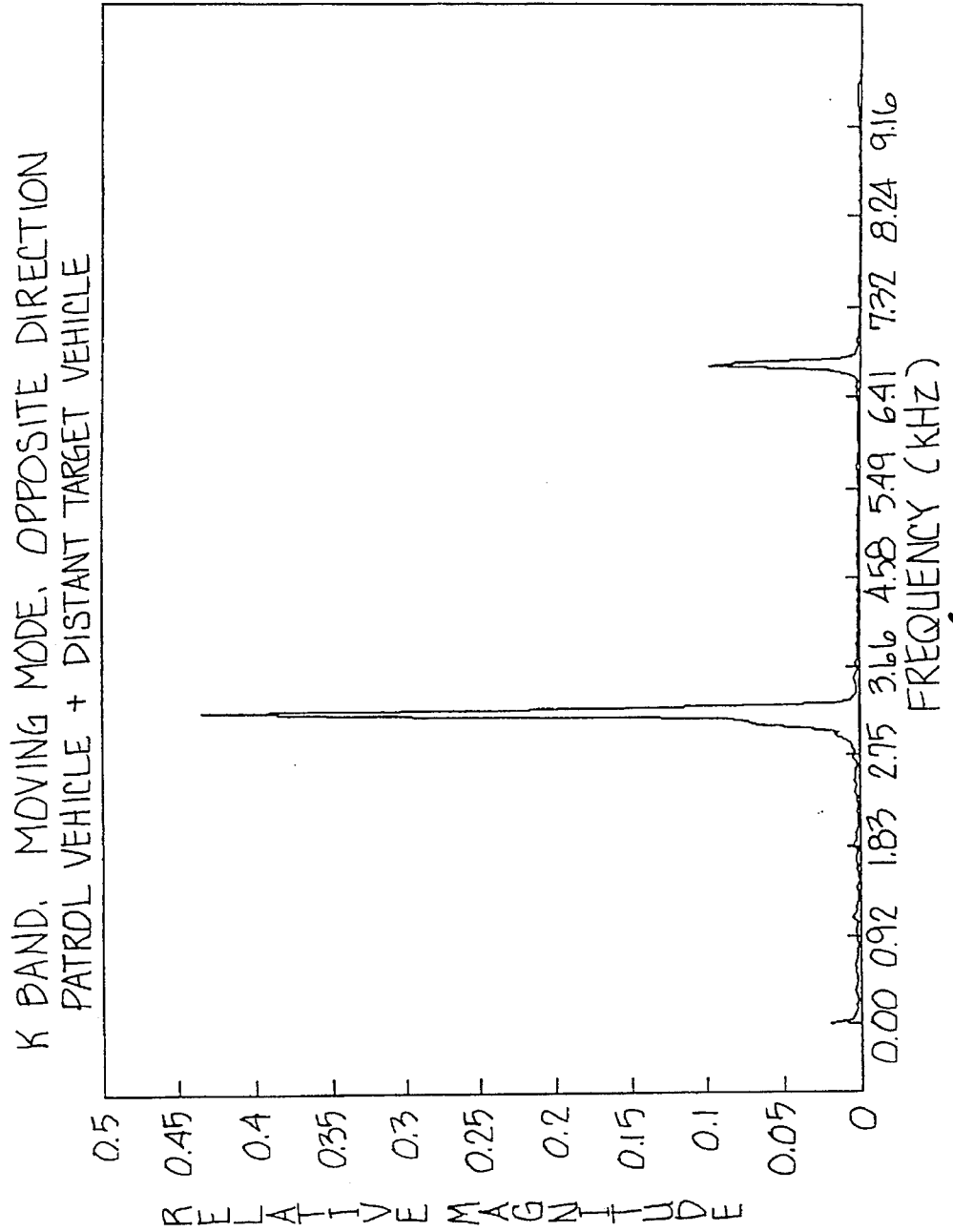

Once the patrol speed has been determined, the target vehicle speed may be processed. In moving mode, opposite direction, the DSP is only processing the speeds of target vehicles traveling in a direction opposite to that of the patrol vehicle (blocks 93 and 117–128, FIGS. 25 and 28). In this case, the Doppler return of the target vehicle will be the frequency shift directly proportional to the speed of the target vehicle added to that of the patrol vehicle. Stated mathematically:

relative target vehicle frequency = absolute patrol vehicle frequency+absolute target vehicle frequency Since this will result in all target vehicle Doppler frequencies being greater than that of the patrol vehicle, the DSP 202 is only required to process those frequencies. Therefore, in order to determine the target vehicle frequency, the patrol vehicle frequency must be subtracted from the combined target + patrol frequency. Referring to FIG. 12, the patrol vehicle's frequency is approximately 3.2 kHz, whereas the combined target + patrol frequency is about 6.7 kHz. By performing the above math relationship, the actual target vehicle Doppler frequency would be approximately 3.5 kHz.

The result is then converted to speed units and sent to the MCU 200. Since the unit has been placed in strongest signal mode, the selected target frequency will be that of the greatest magnitude (sort routine, block 134, FIG. 21), excluding that of the patrol vehicle's Doppler return.

Moving Mode, Opposite Direction, Fastest Signal

Figure 25:
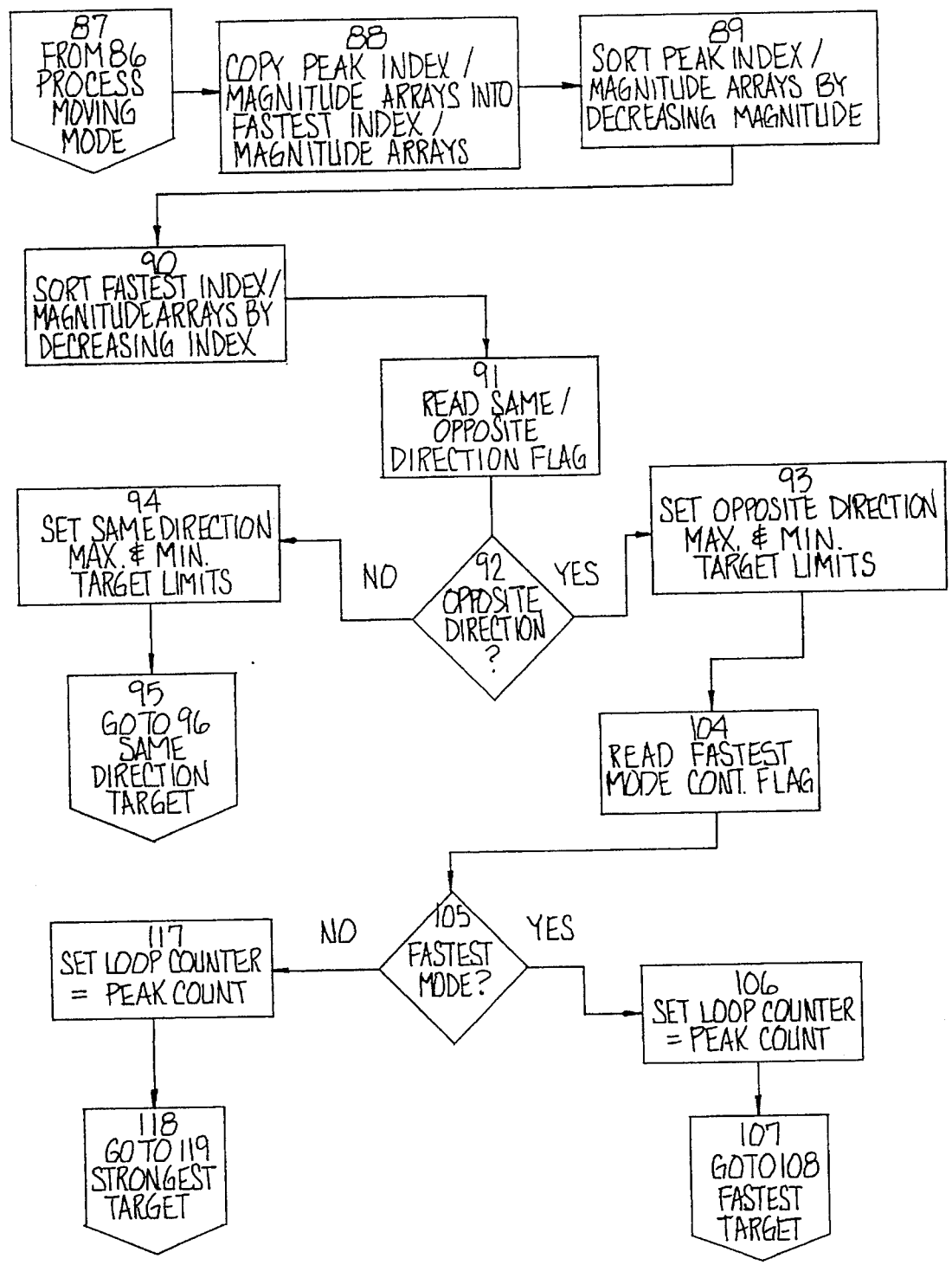
Figure 26:
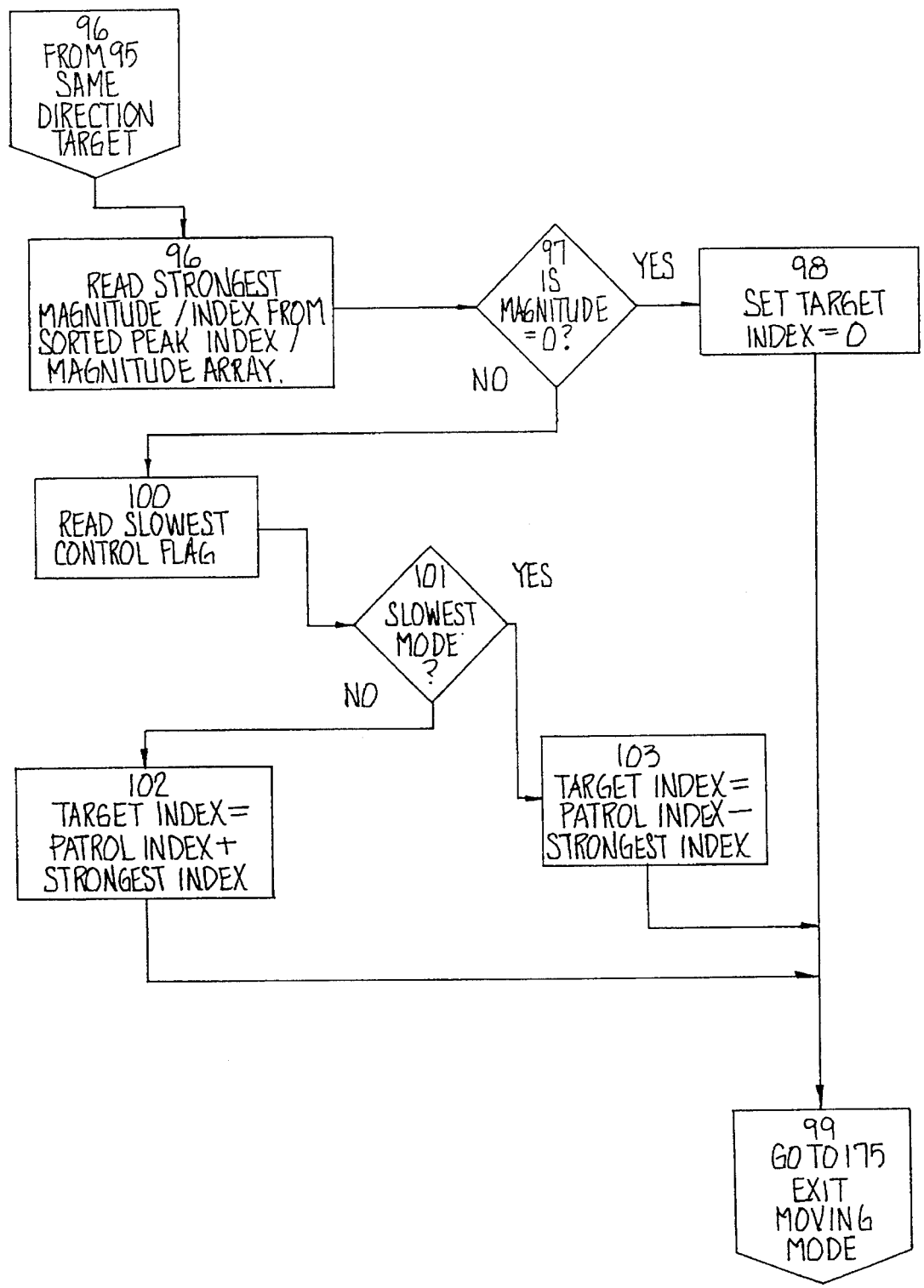
Figure 27:
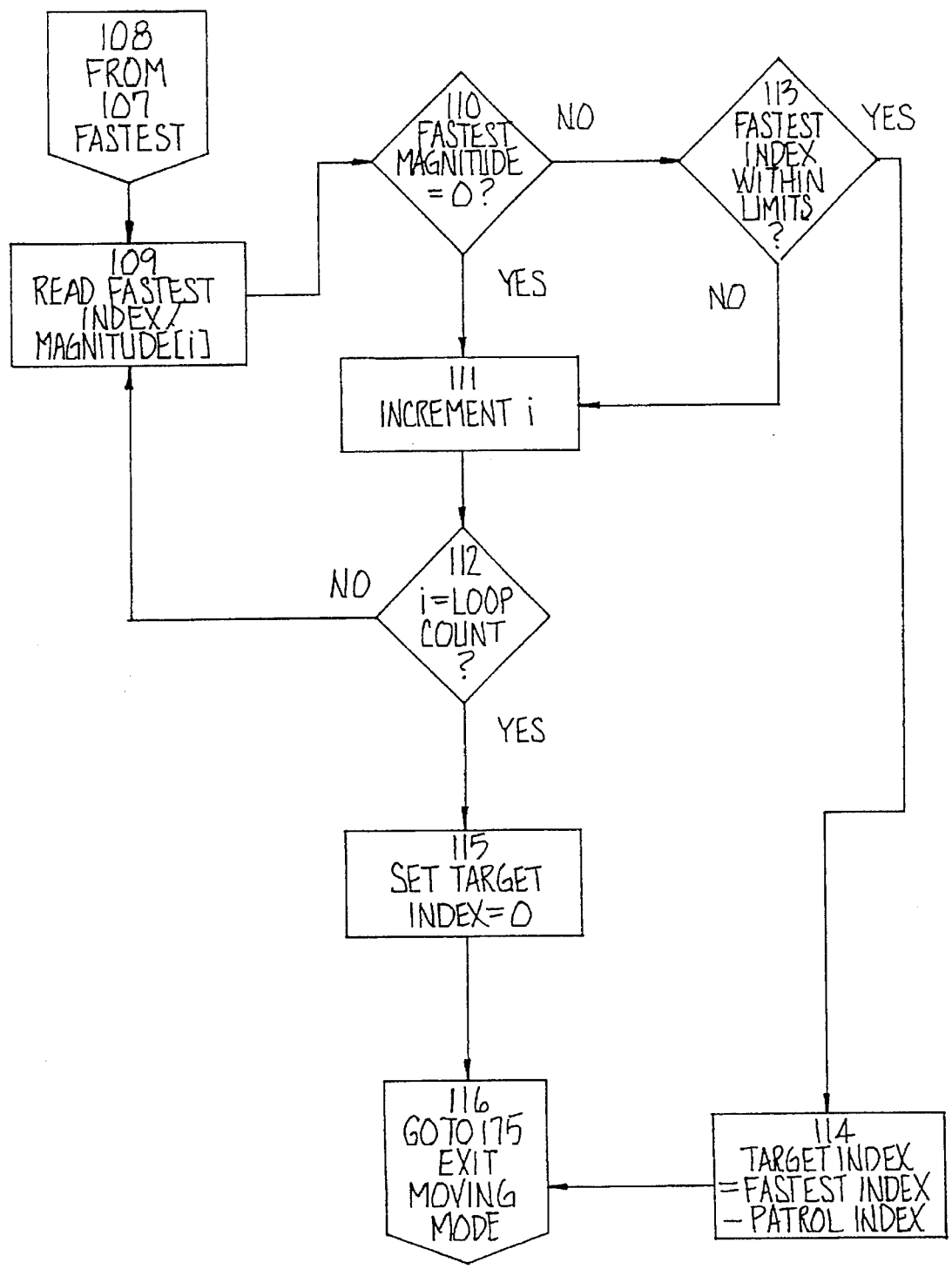
Figure 28:
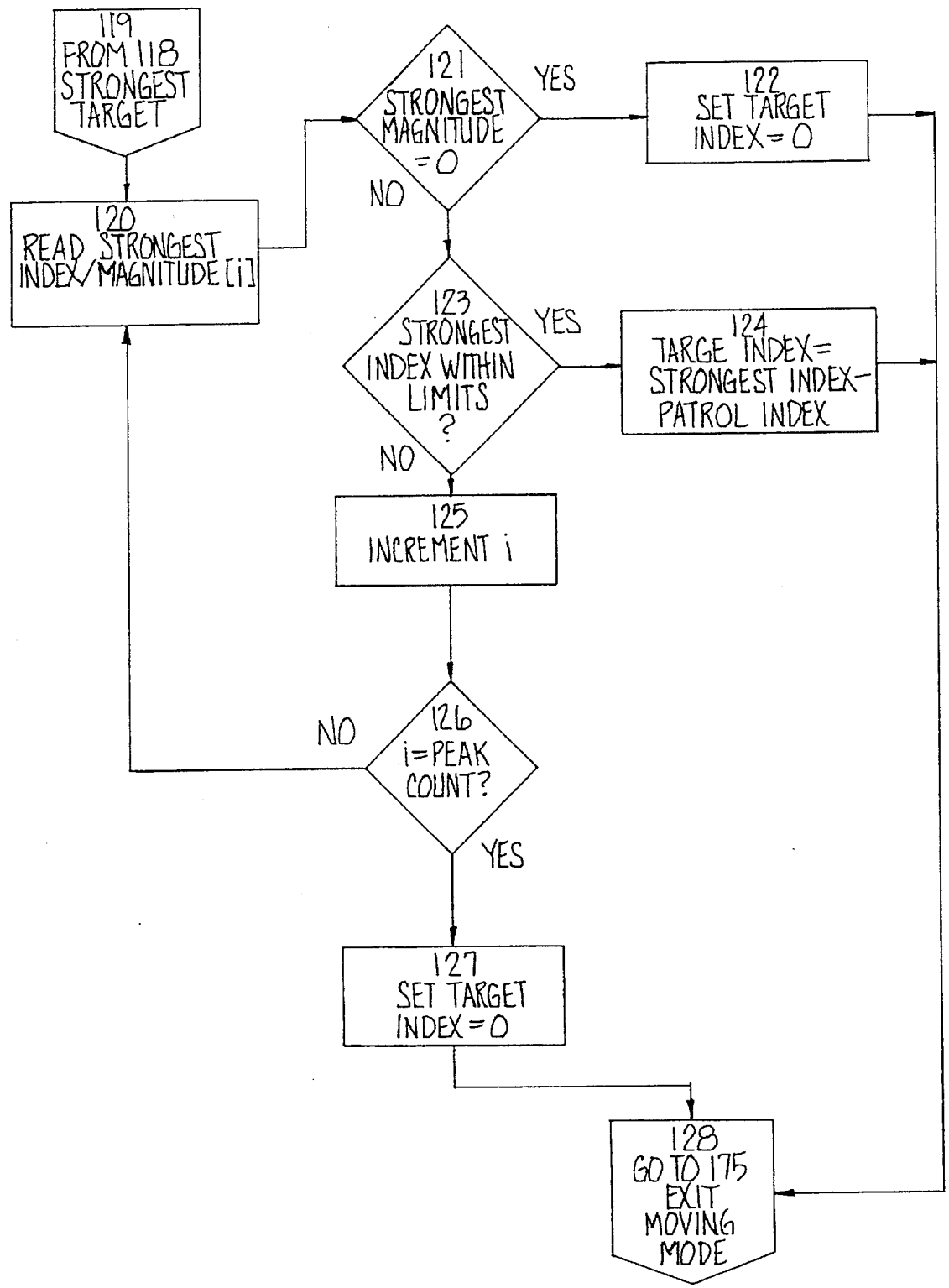

The fastest mode (blocks 106–116, FIGS. 25 and 27) is identical to opposite direction, strongest signal with the exception that the Doppler frequency returns are sorted by decreasing frequency with the highest frequency signal being processed as described above and then transmitted as the target vehicle speed. See sort routine, flow chart block 90 (FIG. 25).

Moving Mode, Same Direction

Figure 13:
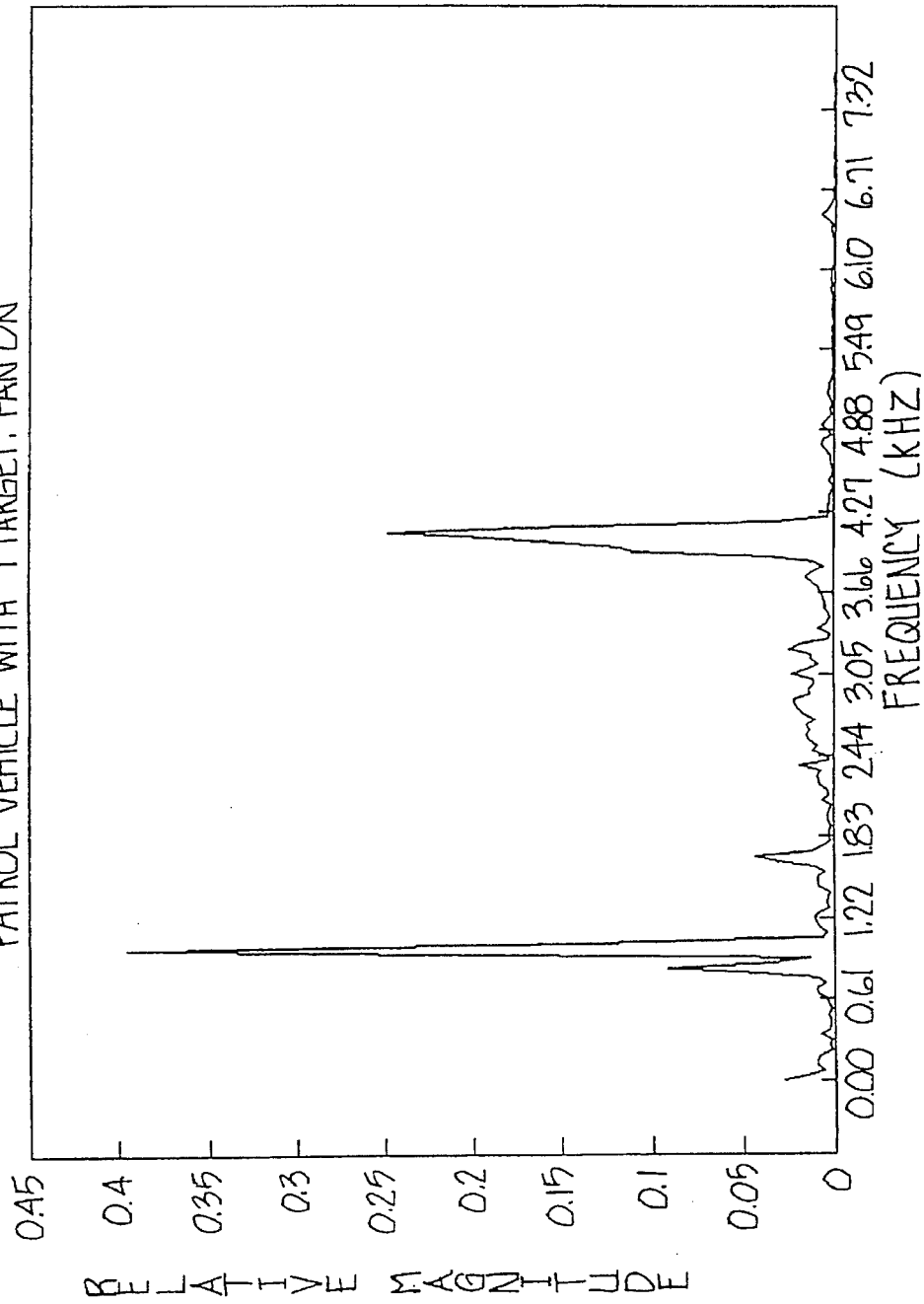

In same direction mode, the target vehicles are traveling in the same direction as the patrol vehicle, resulting in the target vehicle frequency equaling the difference of the patrol vehicle speed and the actual target vehicle speed (refer to FIG. 13). In this case, the target vehicle frequencies may be lower or higher than that of the patrol vehicle depending on target vehicle speed relative to that of the patrol vehicle. The operator has the option of using normal or slower same direction processing. In FIG. 13, the patrol vehicle's frequency is approximately 4.0 kHz where the same direction target vehicle frequency is about 0.8 kHz. The resulting actual target frequency would then be the sum of the two or approximately 4.8 kHz.

Figure 29:
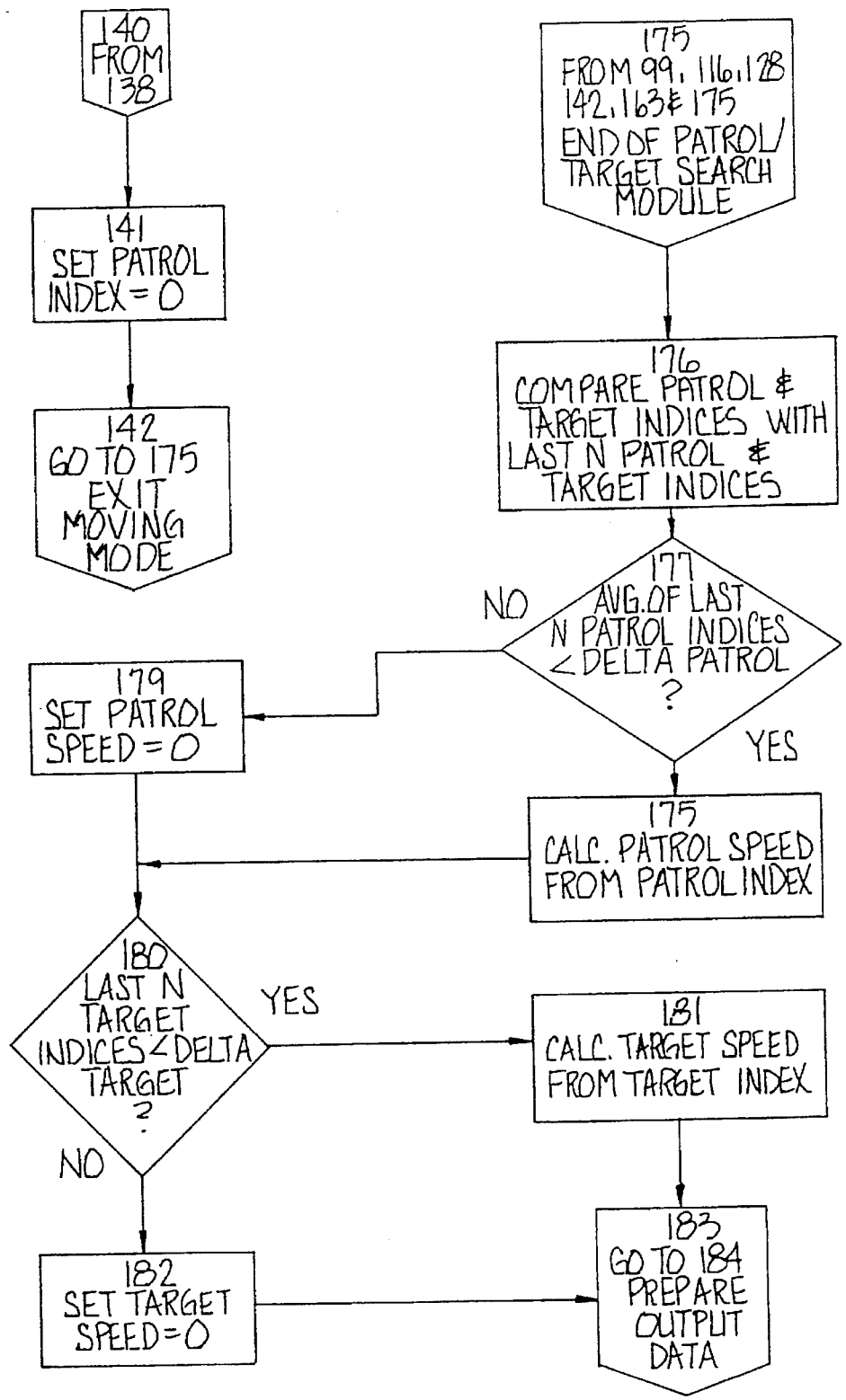
Figure 30:
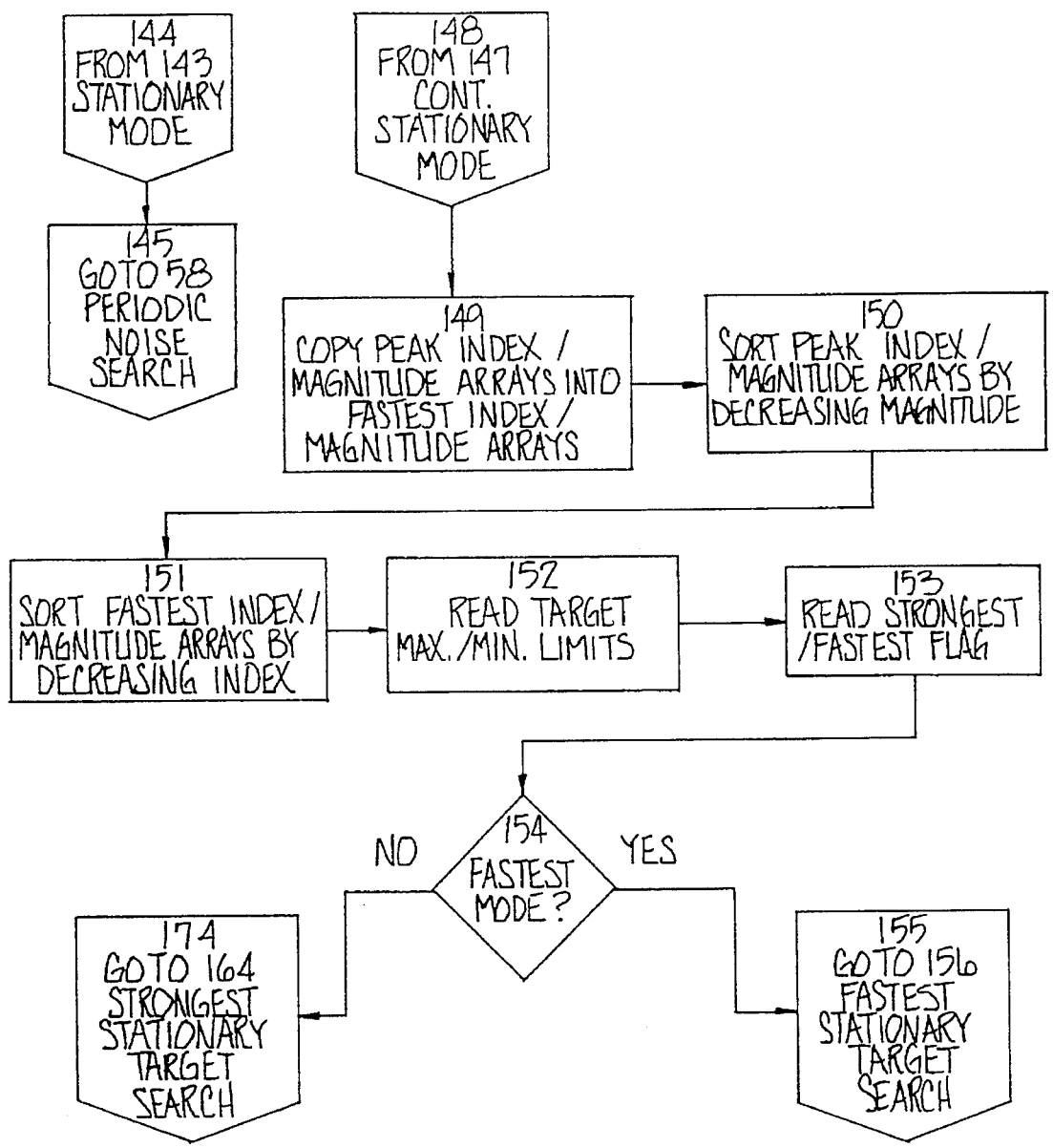
Figure 31:
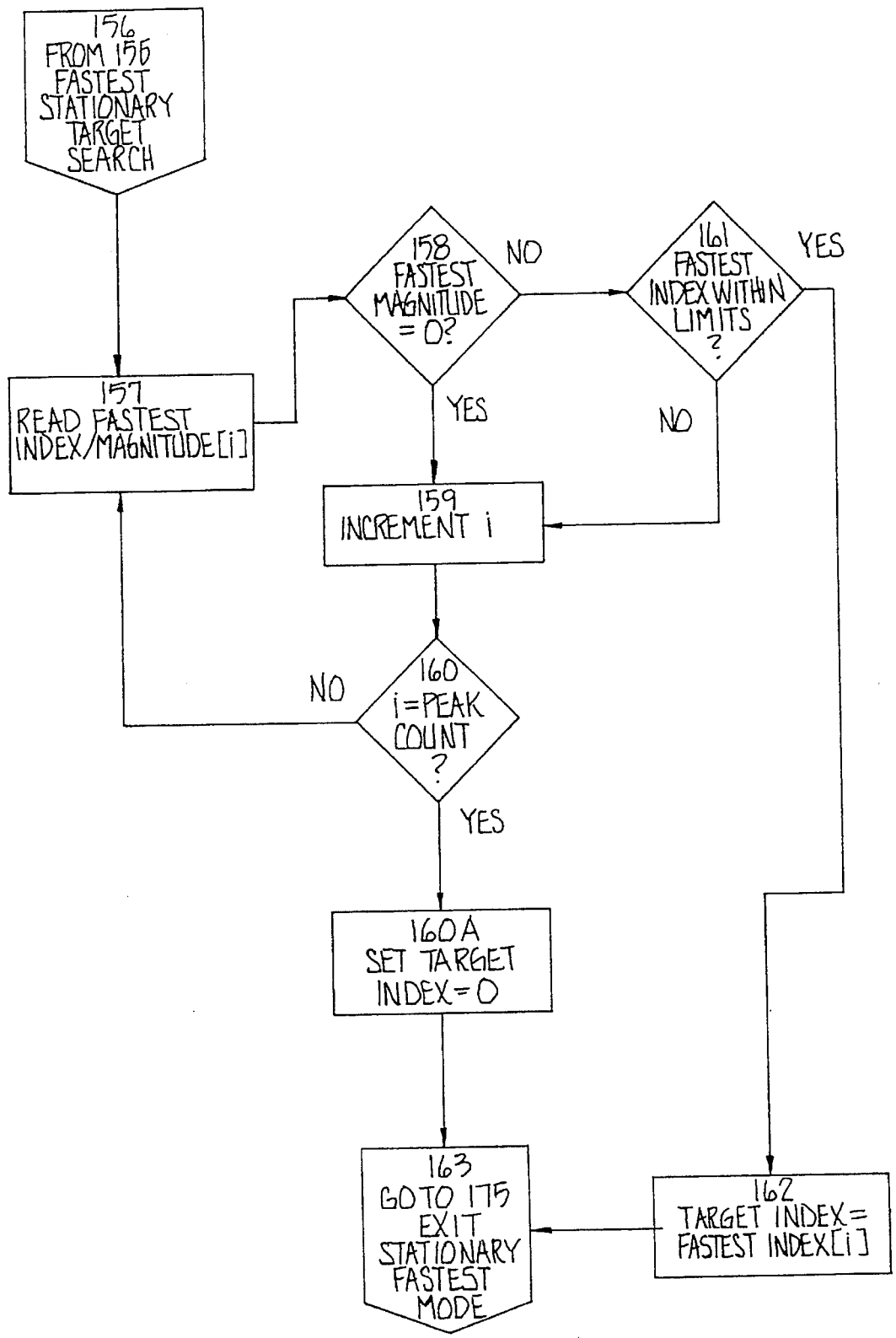
Figure 32:
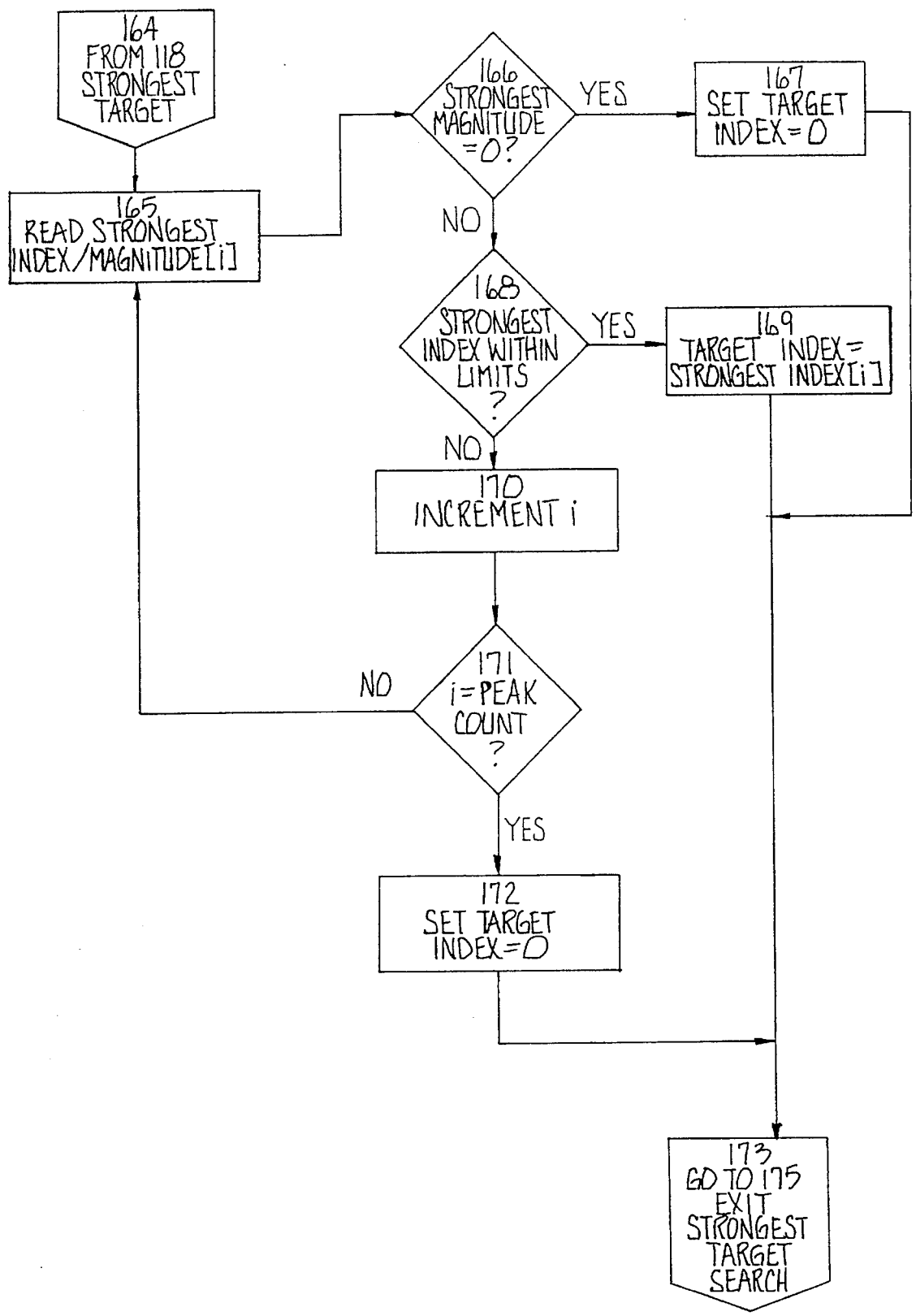
Figure 33:
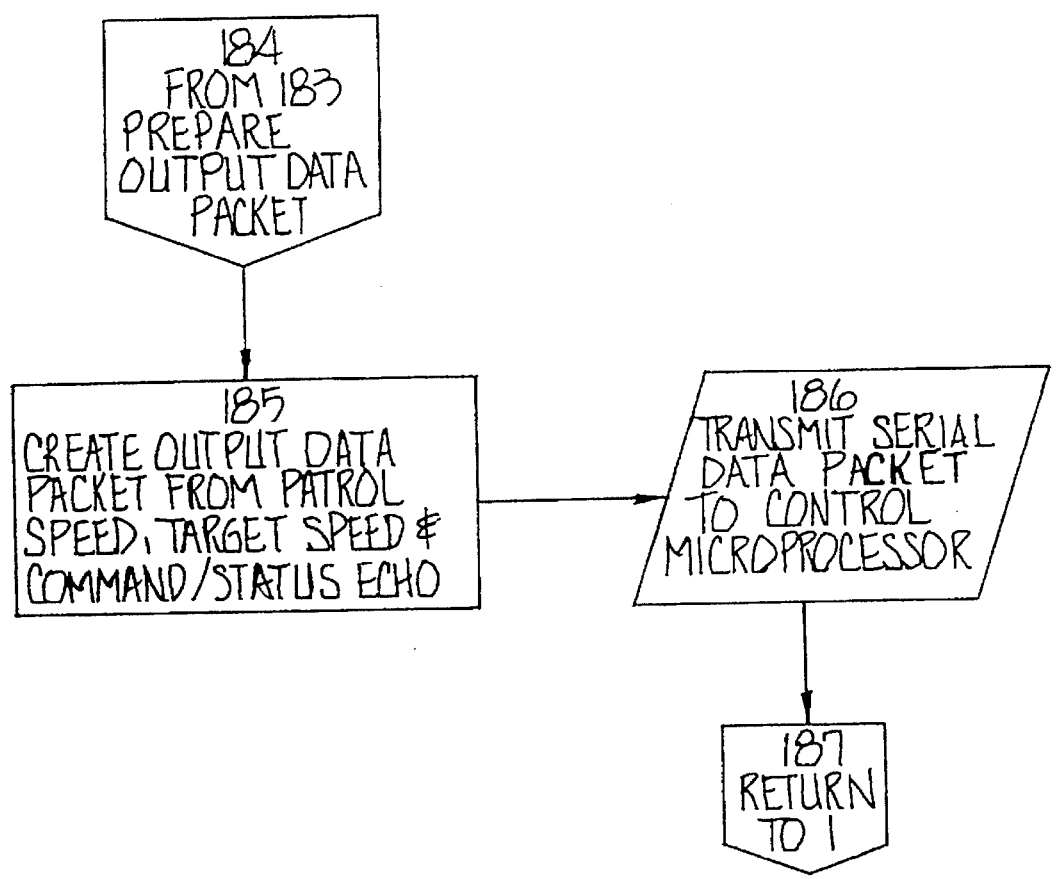

In normal same direction (slower patrol speed) the DSP 202 obtains the target vehicle frequency by adding the strongest signal's frequency to that of the patrol vehicle. In slower mode same direction processing (faster patrol speed) the DSP obtains the target vehicle frequency by subtracting the strongest signal's frequency from that of the patrol vehicle (blocks 96–103, FIG. 26). It should be noted that all target processing is subject to protection from spurious signals having frequencies outside a permissible "Delta Target" (normal acceleration and deceleration of the target), as shown by blocks 180–183 (FIG. 29).

Patrol Speed Determination

Figure 14:
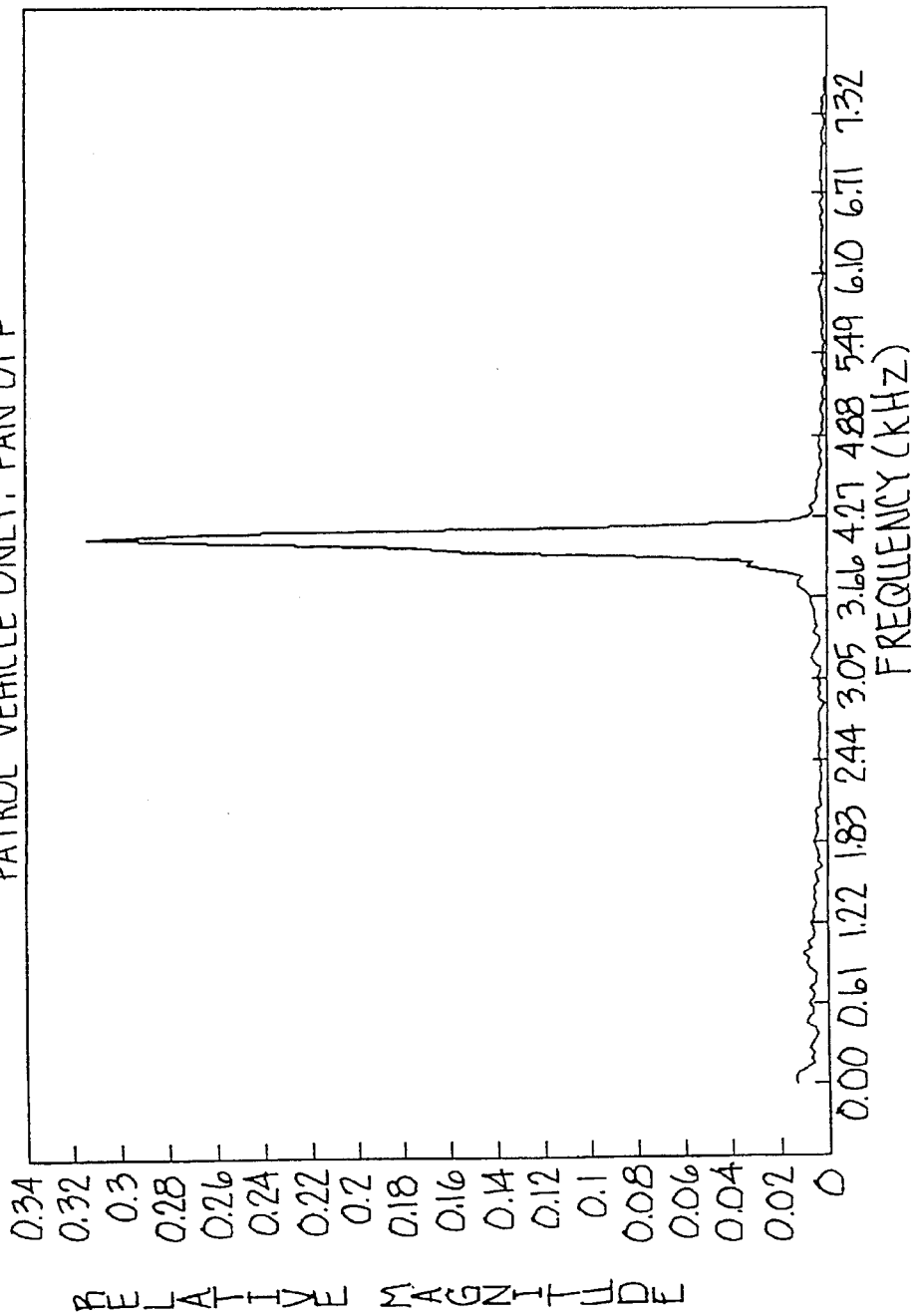
Figure 15:
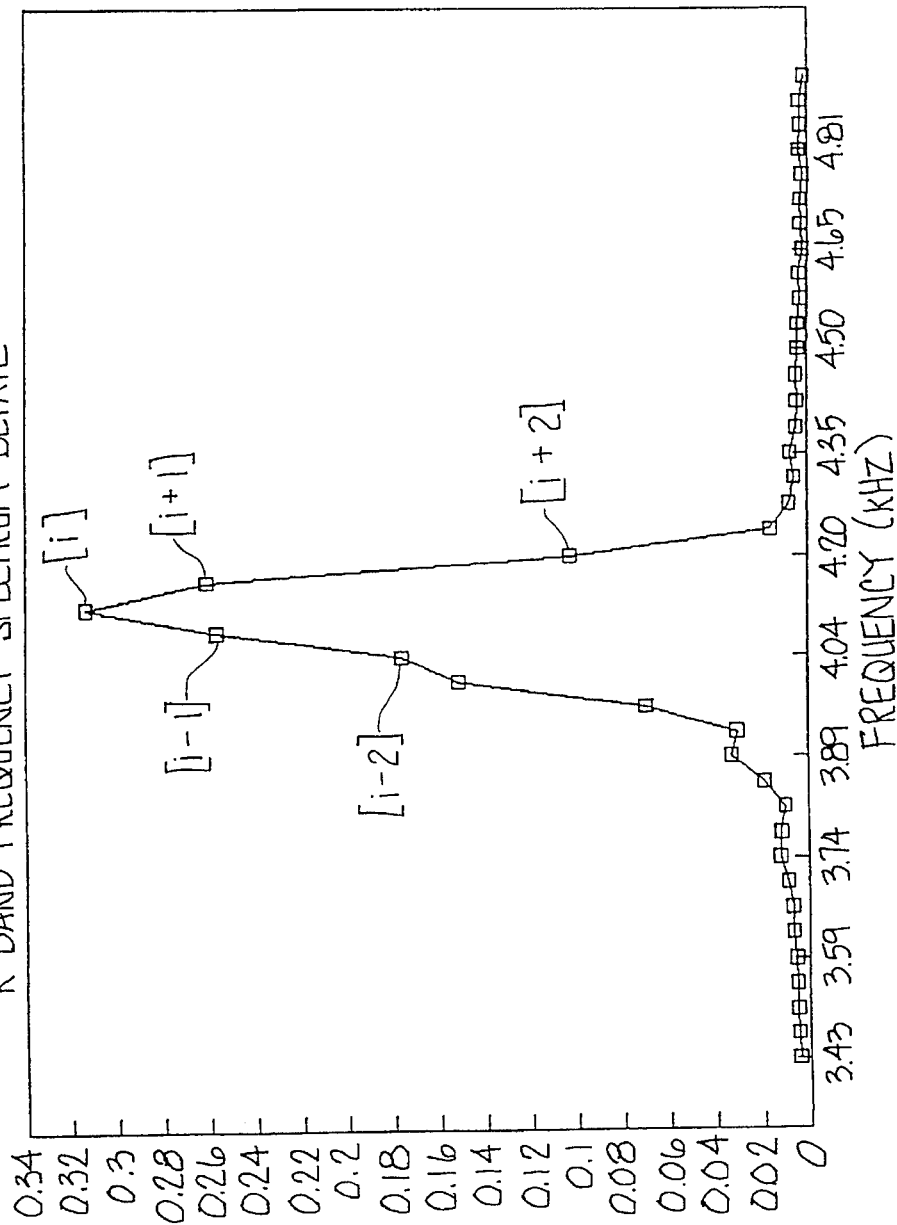

One of the unique features of the DSP based traffic radar is its ability to analyze the frequency information returns of the reflected microwave carrier. Because of the cosine effect phenomenon, the patrol vehicle Doppler return has a unique signature when compared to target vehicle Doppler return signals. FIG. 14 is an example of a patrol vehicle return (no fan interference) viewing the entire spectrum; FIG. 15 is a detail enlarging the signature wherein each frequency bin is identified, the peak being at frequency index [i], adjacent bin magnitudes being at indices [i+1] and [i−1], etc. The spectrum is unaffected by direction mode (same/opposite) configuration.

The radar relies on ground reflection Doppler signals to determine the patrol vehicle speed. The antenna transmits a microwave carrier and any portion reflected off any surface towards the receive antenna is processed by the DSP 202. In the case of the patrol vehicle, any and all stationary surfaces may reflect a signal to the receive antenna. Since the antenna is moving but the stationary surfaces are not, the result is similar to a stationary mode of operation, i.e., the frequency of the return signal is directly proportional to the patrol vehicle's speed.

Due to the cosine effect, though, the stationary surfaces may or may not be directly in the path of the vehicle and will reflect frequencies directly proportional to the patrol vehicle's speed and frequencies below the patrol vehicle's speed, all depending on the angle of the reflecting surface in regard to the direction of the patrol vehicle. This phenomena produces a patrol vehicle frequency signature or pattern that has its peak magnitude at the actual Doppler return frequency with lower frequency sub-peaks of decreasing magnitude.

Figure 20:
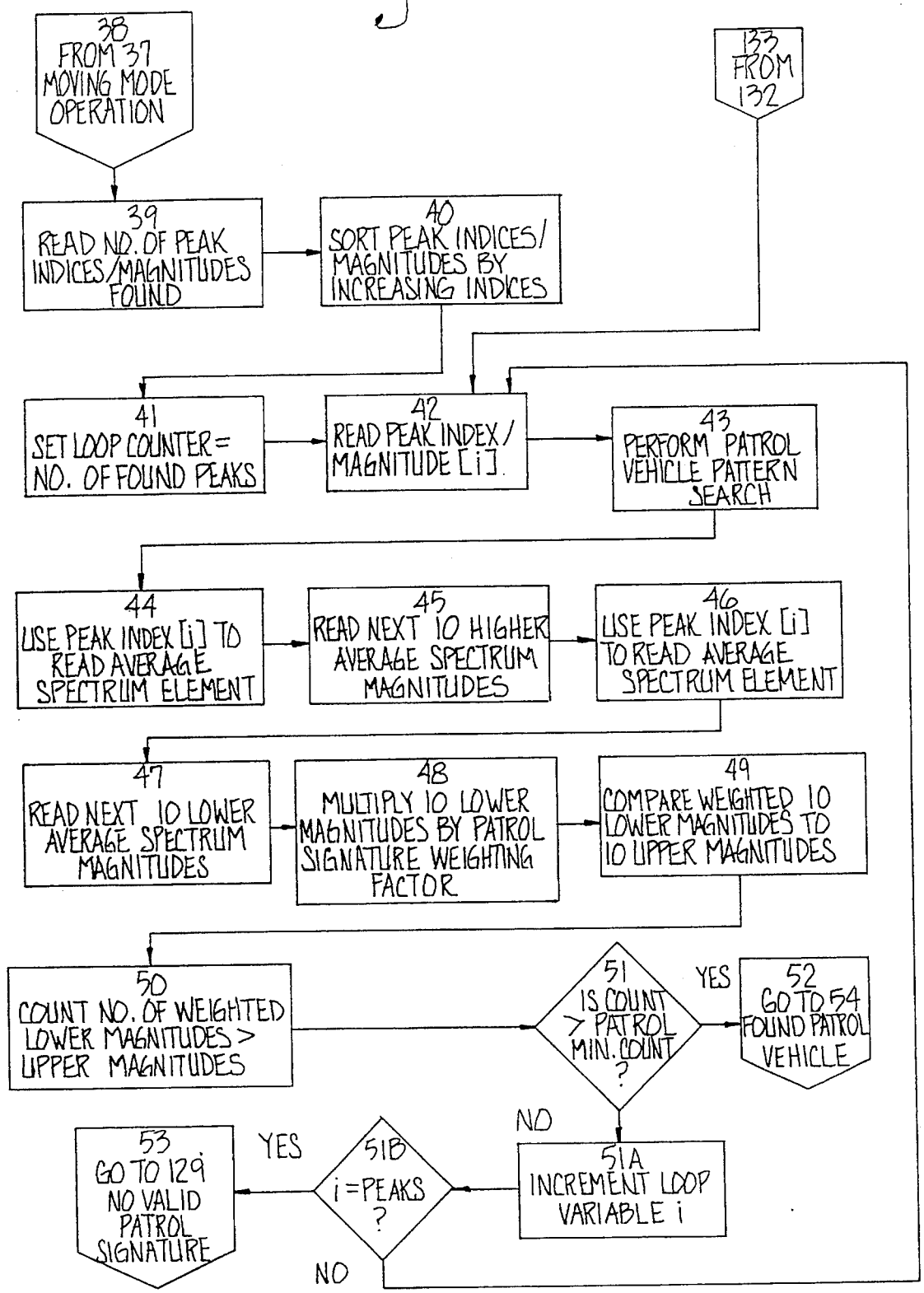
Figure 21:
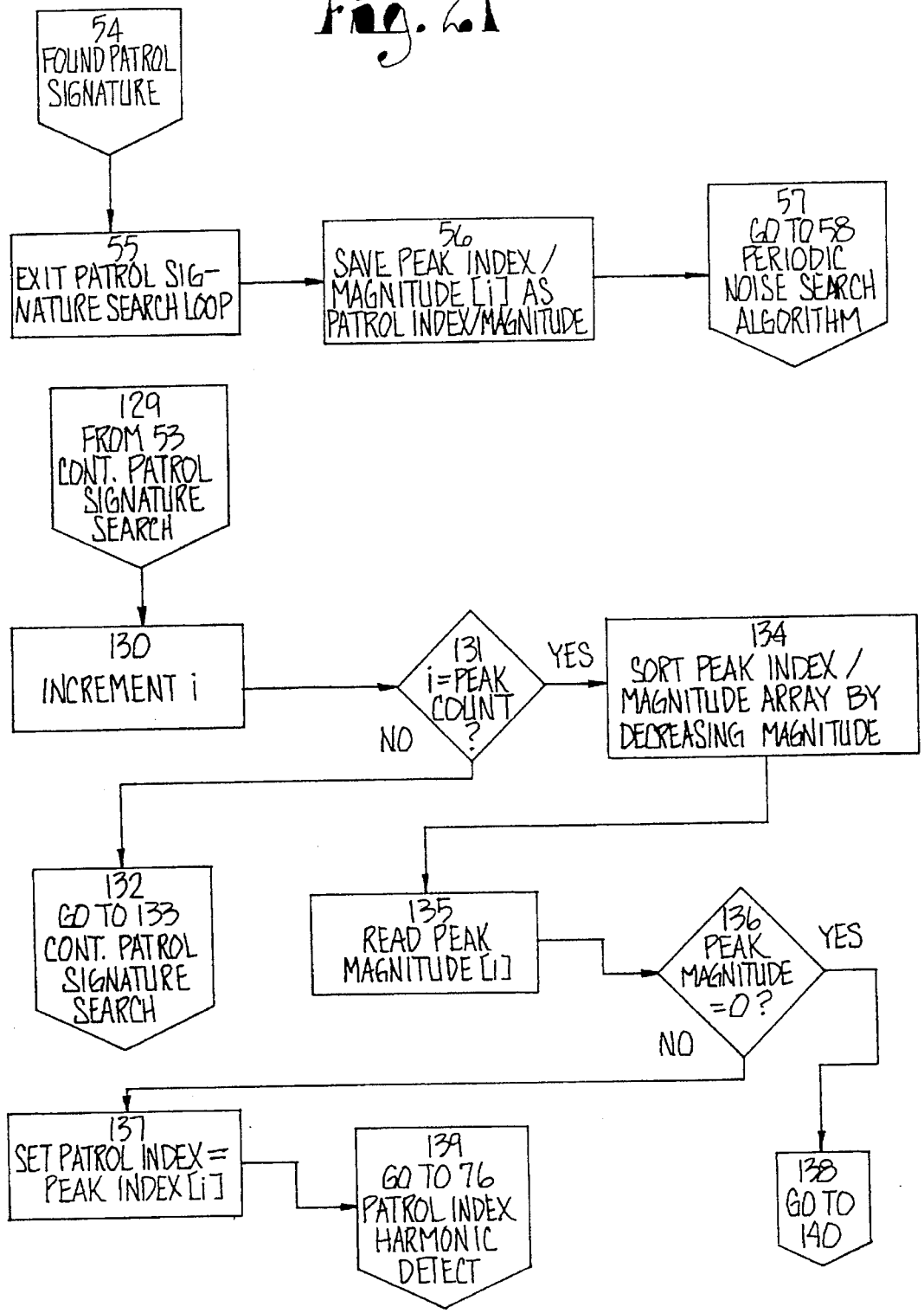
Figure 22:
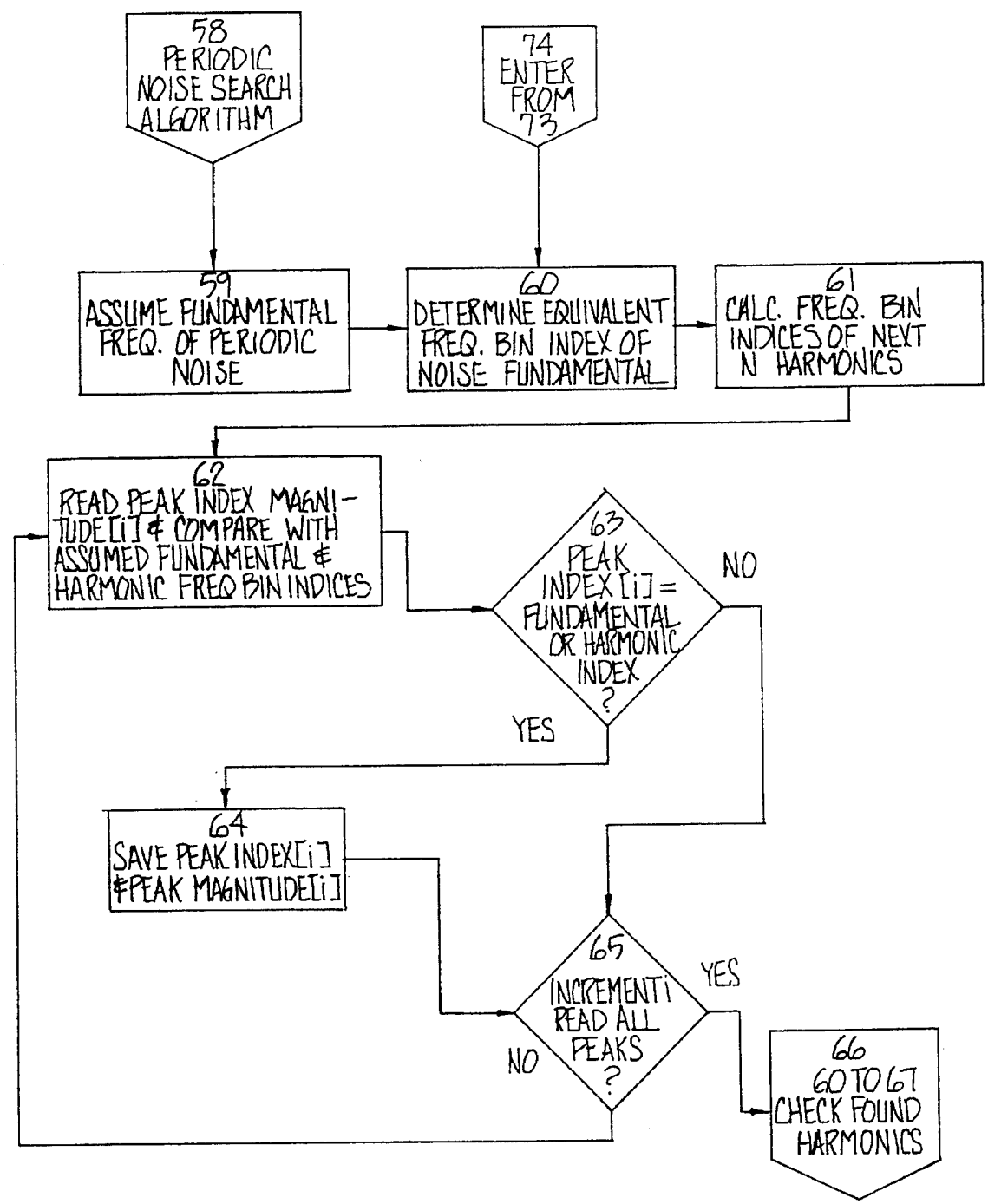
Figure 23:
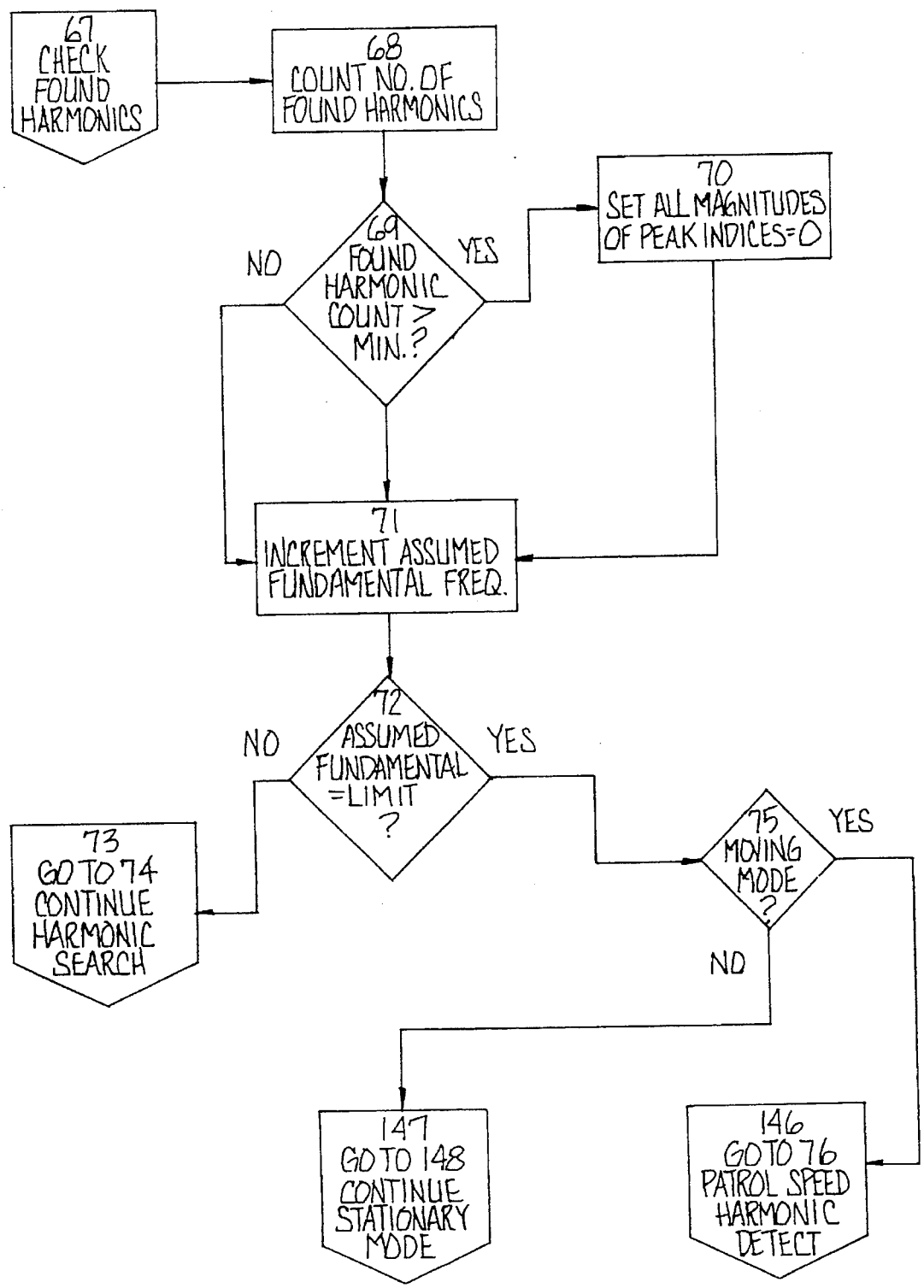

As is particularly evident in the frequency detail of FIG. 15, the patrol vehicle Doppler return exhibits an asymmetry due to the cosine return effect that is unique to the patrol vehicle. The existence of the asymmetry is identified by blocks 38–51 (FIG. 20). If the magnitude peak frequency bin can be determined using the maxima described earlier, then it is a matter of comparing upper and lower frequency bin magnitudes for the asymmetry peculiar to the patrol vehicle.

Statistical analysis of repeated sampling of patrol vehicle spectra indicates that adequate sampling is accomplished by comparing the upper and lower 10 frequency bins using the following relationship:

Actual frequency magnitude peak=frequency index [i]

Read first upper bin magnitude, i.e., frequency index [i+1]

Read first lower bin magnitude, i.e., frequency index [i−1]

Multiply frequency index [i−1] by patrol curve weighing factor

Compare weighted lower bin magnitude to upper bin magnitude

If weight lower>upper, increment patrol pattern match count

Repeat for second upper bin, i.e., frequency index [i+2] and second lower bin, frequency index [i−2]

Compare and increment if criteria met

Repeat for remaining upper and lower bins 3–9

Read resulting patrol pattern match count, if greater than minimum count, save original frequency index [i] as patrol frequency If not, read and compare next frequency magnitude peak.

All qualified maxima are compared, starting at lowest frequency and continuing until criteria are met or all peaks have been searched. In case of no matching criteria found, patrol speed is then determined by the traditional analog method of assuming the strongest Doppler return is that of the patrol vehicle.

Tests indicate that the patrol speed can be accurately found by this pattern search approximately 60% to 70% of the time, with strongest return still used as a fallback. In testing this has almost entirely eliminated the pull-down effect noticed in analog radar when an extremely strong cosine effect is noticed due to passing large signs, guard rails, overpasses or embankments without resorting to a direct mechanical link to the patrol vehicle speedometer.

By being able to recognize this pattern instead of simply relying on the strongest Doppler return signal, the DSP 202 has an increased ability to track the patrol vehicle's actual speed. This signature is dependent on road surfaces and conditions. Rain, snow and ice, as well as hill ascent, will decrease the amount of Doppler return and reduce the patrol signature pattern amplitude. In cases of not being able to determine the pattern, the DSP 202 then relies on the more traditional method of strongest amplitude Doppler return (blocks 129–139, FIG. 21). If the patrol speed has changed outside accepted limits ("Delta Patrol") that permit expected variation due to acceleration or deceleration, this is indicated by a spurious signal and patrol speed is reset to zero and processing continues (blocks 176–179, FIG. 29).

Harmonic Interference Detection and Reduction

With later model patrol vehicles, Doppler frequency interference caused by a signal return from the heating and air conditioning fan blades may seriously degrade the performance of analog radars. In older vehicles the heater/ac fan was mounted on the engine side of the fire wall, effectively blocking any possible path of radar reflection from the fan blades. Some newer model vehicles mount the fan on the passenger compartment side of the fire wall significantly increasing the probability of radar/Doppler signal reflection back to the radar antenna. The result is a serious reduction in the effective range of the radar unit as well as the possibility of displaying false speeds caused by the radar processing the Doppler return signal from the fan blades instead of actual target vehicles.

Figure 16:
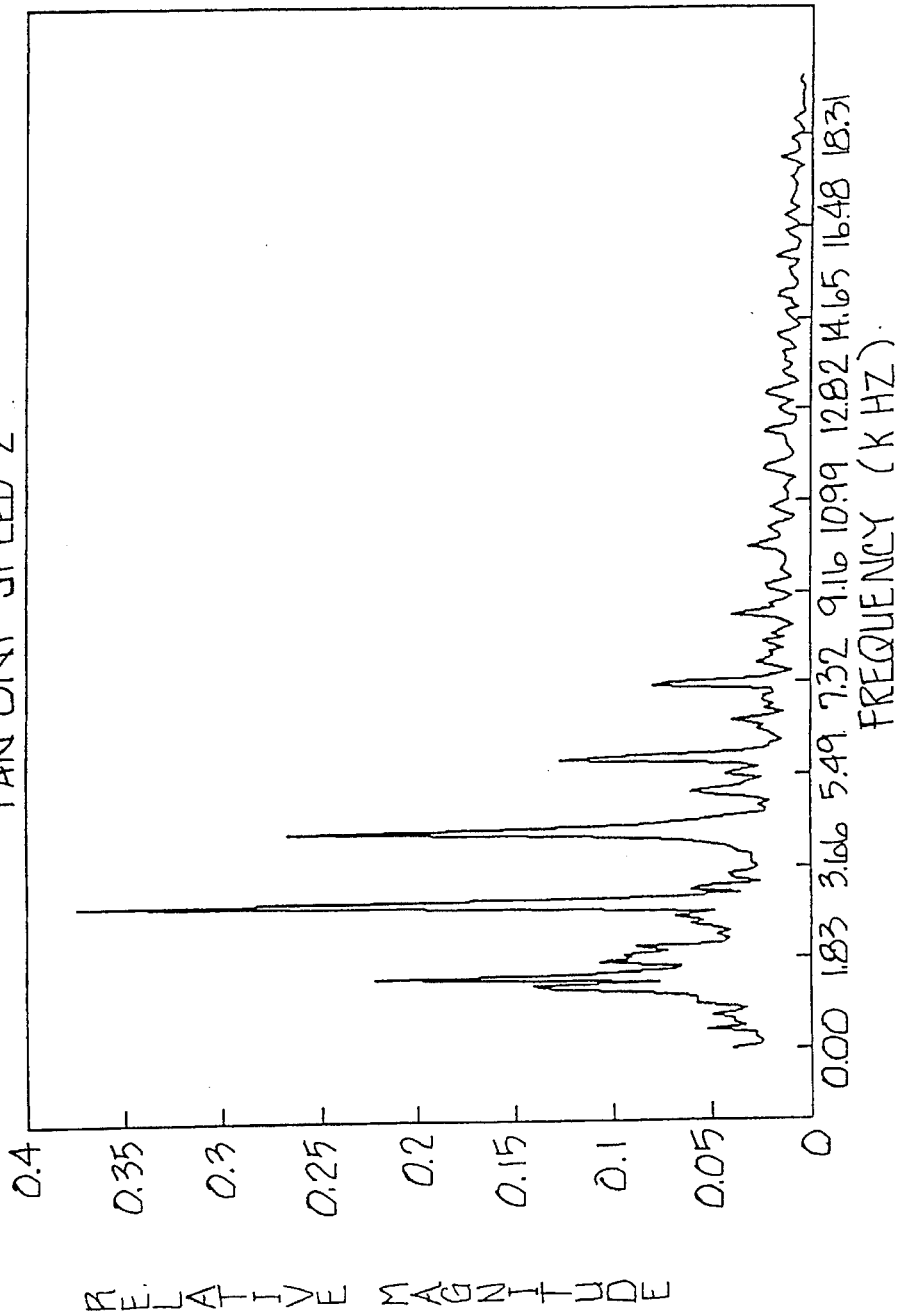

By sampling Doppler return patterns from several different vehicles operating either the heater or air conditioner at different fan speeds, it has been found that the signature of the fan interference may be characterized as illustrated in FIG. 16. Essentially the fan creates a harmonic pattern of integer multiple harmonics. In FIG. 16, five harmonics can easily been seen at approximately 1.46, 2.92, 4.39, 5.86 and 7.32 kHz. After the second harmonic at 2.92 kHz, it can also be seen that the magnitude rapidly decreases. By utilizing an algorithm to search and recognize this type of harmonic pattern in the frequency domain, the DSP can effectively search the frequency spectrum, discover and eliminate the majority of the fan caused harmonic peaks. The only significant trade-off is the possibility of not recognizing a target vehicle whose frequency is essentially equal to one of the harmonics.

Harmonic Detect Algorithm

This algorithm is executed in blocks 58–72 (FIGS. 22 and 23) and assumes and creates a harmonic pattern sequence and then scans the frequency spectrum for a minimum number of matches, as follows:

A fundamental frequency is assumed

The discovered frequency peaks are searched for any match

If a match is discovered that frequency peak index is recorded

The second harmonic of the assumed fundamental is calculated

The remaining frequency peaks are searched for any match

A discovered match is recorded

The procedure is repeated up to the sixth harmonic. Once all frequency peaks have been searched and recorded for all assumed harmonics, the number of matches are checked. If a minimum number of matches have been discovered, the magnitude elements of the frequency peaks arrays are set to zero. If no matches have been found, the next fundamental frequency is assumed and the process is repeated until either a series of matches are discovered and cleared (set to zero) or until the fundamental limit value has been reached, at which time it is concluded that no fan harmonics are present and therefore no magnitude elements are cleared. In subsequent target vehicle processing, regardless of whether in fastest or strongest mode, any peak index element magnitude cleared to zero is not considered a valid target.

Figure 24:
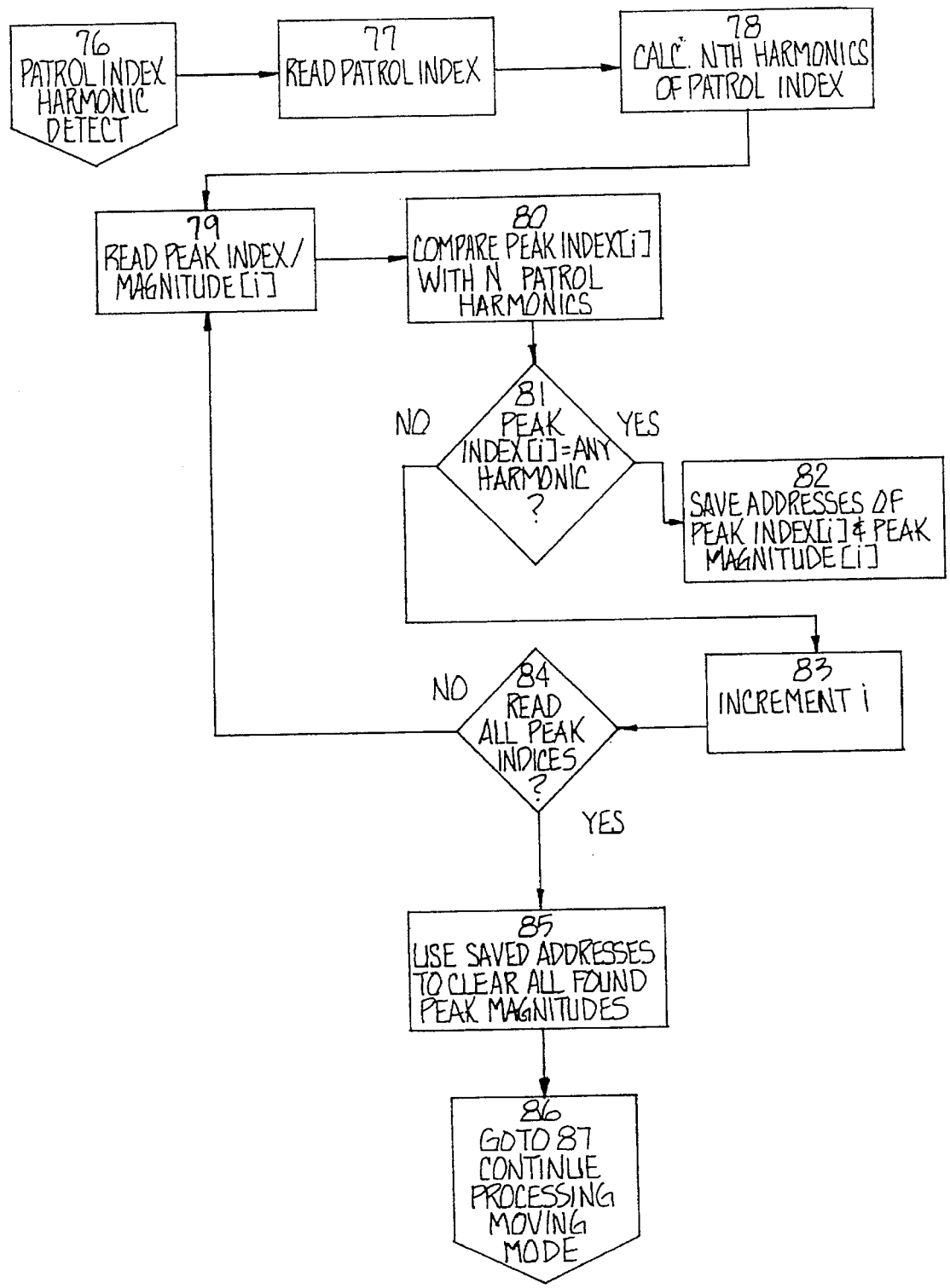

The same algorithm is also used to determine patrol speed harmonics. Since the patrol vehicle Doppler return is usually of a large magnitude, there is a possibility that the Doppler could actually double bounce and generate a false reading, i.e., the patrol Doppler return could actually reflect from the front of the patrol vehicle forwardly to an object in front of the patrol vehicle and then, in turn, be reflected again back to the radar antenna. The effect of such a multiple bounce is to cause a false target frequency of two or three times that of the patrol vehicle. For example, if the patrol vehicle is traveling at 55 mph, a double bounce could cause the unit to receive the frequency equivalent of 110 mph and cause this false target speed to be displayed. This error condition is eliminated in the present invention by using the patrol frequency bin index as the assumed fundamental in the harmonic detect algorithm as shown in flow chart blocks 76–85 (FIG. 24).

Having thus described the invention, what is claimed as new and desired to be secured by Letters Patent is:

1. In a traffic radar capable of operation on a plurality of bands:

means for receiving Doppler return information containing at least one return signal derived from a target vehicle, and for presenting said information as digital data, means for transforming said data into the frequency domain to provide a spectrum that includes frequency components corresponding to Doppler return signals contained in said information, memory means for storing said components, means for searching the components stored in said memory means to identify the component that meets preselected magnitude or frequency criteria, an antenna unit for a selected band having an output for delivering said Doppler return information, storage means for storing operating parameters for each of said bands, and an operating memory for receiving the parameters of the band in use, means for connecting said antenna unit to said receiving means including an identifying connection having an electrical characteristic indicative of said selected band, and means responsive to said electrical characteristic for reading the operating parameters of said selected band from said storage means and loading those parameters into said operating memory, whereby to automatically configure the radar for operation on said selected band.

2. In a Doppler traffic radar capable of operation on a plurality of bands:

an antenna unit for a selected band having an output for delivering a Doppler return signal derived from a target vehicle, means for processing a Doppler return signal and indicating the speed of the target vehicle, means for connecting said antenna unit to said processing means including an identifying connection having an electrical characteristic indicative of said selected band, and said processing means having means responsive to said electrical characteristic for configuring the processing means to correspond to said selected band and effect correct Doppler processing of return signals from the output of said antenna unit, whereby to automatically configure the radar for operation on said selected band.

3. In a Doppler traffic radar capable of operation on a plurality of bands:

an antenna unit for a selected band having an output for delivering a Doppler return signal derived from a target vehicle, means for processing a Doppler return signal and indicating the speed of the target vehicle, including means for storing operating parameters for each of said bands and an operating memory for receiving the parameters of the band in use, means for connecting said antenna unit to said processing means including an identifying connection having an electrical characteristic indicative of said selected band, and said processing means having means responsive to said electrical characteristic for reading the operating parameters of said selected band from said storage means and loading those parameters into said operating memory, whereby to automatically configure the radar for operation on said selected band.

4. The combination as claimed in claim 3, wherein said identifying connection has a logic level providing said electrical characteristic indicative of said selected band.

5. The combination as claimed in claim 3, wherein said processing means further includes frequency dependent, programmable devices, and means for programming said devices in response to the parameters loaded into said operating memory.

* * * * *